United States Patent
Yamaguchi et al.

(10) Patent No.: US 7,445,839 B2
(45) Date of Patent: Nov. 4, 2008

(54) FOAM SHEET FOR CAR INTERIOR MEMBER, AND CAR INTERIOR MEMBER

(75) Inventors: Katsumi Yamaguchi, Nara (JP); Hiroyuki Ueno, Nara (JP); Hiroyuki Sadakuni, Wako (JP); Akihiro Matsuura, Nagoya (JP); Hideo Sugimura, Nagoya (JP); Hideyuki Deguchi, Nagoya (JP)

(73) Assignees: Sekisui Plastics Co., Ltd., Osaka (JP); Hayashi Telempu Co., Ltd., Aichi (JP)

( * ) Notice: Subject to any disclaimer, the term of this patent is extended or adjusted under 35 U.S.C. 154(b) by 0 days.

(21) Appl. No.: 10/566,970

(22) PCT Filed: Aug. 6, 2004

(86) PCT No.: PCT/JP2004/011379

§ 371 (c)(1),
(2), (4) Date: Feb. 2, 2006

(87) PCT Pub. No.: WO2005/015539

PCT Pub. Date: Feb. 17, 2005

(65) Prior Publication Data

US 2007/0020447 A1 Jan. 25, 2007

(30) Foreign Application Priority Data

| Aug. 8, 2003 | (JP) | ............................. 2003-290692 |
| Jan. 16, 2004 | (JP) | ............................. 2004-008859 |
| Jun. 17, 2004 | (JP) | ............................. 2004-179913 |

(51) Int. Cl.
*B32B 27/08* (2006.01)

(52) U.S. Cl. .............. 428/319.3; 428/319.7; 428/318.6; 428/318.8; 428/316.6; 428/315.5; 428/315.7; 428/131; 428/310.5

(58) Field of Classification Search .............. 428/316.6, 428/310.5, 131, 318.8, 319.3, 319.7
See application file for complete search history.

(56) References Cited

U.S. PATENT DOCUMENTS 5,145,877 A * 9/1992 Bopp et al. ................... 521/40

(Continued)

FOREIGN PATENT DOCUMENTS

EP 0 647 513 A2 4/1995

(Continued)

OTHER PUBLICATIONS

International Search Report, Oct. 26, 2004.

(Continued)

*Primary Examiner*—Hai Vo
(74) *Attorney, Agent, or Firm*—Cheng Law Group PLLC

(57) ABSTRACT

The present invention provides a foam sheet for a car interior member which is capable of being molded into a desired shape while keeping an excellent sound absorbency. The foam sheet for a car interior member according to the invention comprises a modified polyphenylene ether-based resin foam sheet having an open cell ratio of 50% or more, and the modified polyphenylene ether-based resin foam sheet has pore portions formed in a single face thereof so as to be open to the face thereof. Accordingly, vibration energy of sounds is smoothly induced through the pore portions to the open cells of the foam sheet 1 to vibrate cell walls of the open cells, thereby converting the vibration energy to thermal energy. Thus, an excellent sound absorbency is exhibited.

17 Claims, 9 Drawing Sheets

U.S. PATENT DOCUMENTS

| | | | | |
|---|---|---|---|---|
| 5,618,853 | A | * | 4/1997 | Vonken et al. ................. 521/60 |
| 6,042,765 | A | * | 3/2000 | Sugahara et al. ............ 264/46.1 |
| 6,103,163 | A | * | 8/2000 | Joppen et al. ............. 264/210.2 |
| 7,166,348 | B2 | * | 1/2007 | Naito et al. .................... 428/71 |
| 2004/0229030 | A1 | * | 11/2004 | Owensby ................. 428/316.6 |

FOREIGN PATENT DOCUMENTS

| | | |
|---|---|---|
| JP | 05-041771 U | 6/1993 |
| JP | 05-179546 A | 7/1993 |
| JP | 07-108555 | 4/1995 |
| JP | 08-325914 A | 12/1996 |
| JP | 10-193519 A | 7/1998 |
| JP | 11-334485 A | 12/1999 |
| JP | 2001-353763 A | 12/2001 |
| JP | 2002-275298 A | 9/2002 |
| JP | 2002-283482 | 10/2002 |
| JP | 2003-170784 | 6/2003 |
| JP | 2003-170784 A | 6/2003 |
| JP | 2003-334875 | 11/2003 |
| JP | 2003-334875 A | 11/2003 |
| JP | 2004-001347 A | 1/2004 |
| WO | WO 0222723 A1 * | 3/2002 |

OTHER PUBLICATIONS

Notification of Reasons for Refusal for the Application No. 2004-008859 from Japan Patent Office mailed Jul. 29, 2008.

* cited by examiner

FOAM SHEET FOR CAR INTERIOR MEMBER, AND CAR INTERIOR MEMBER

TECHNICAL FIELD

The present invention relates to a foam sheet for a car interior member, which is used as a car interior member such as a car ceiling member or a door member.

BACKGROUND ART

Hitherto, various car interior members have been suggested. For example, Patent Document 1 suggests, as one of such car interior members, a car interior member comprising a skin material and a foamed laminate, wherein the foamed laminate has a structure that non-foamed layers made of a thermoplastic resin are laminated on both faces of a foamed layer made of, as a basic resin, a modified polyphenylene ether-based resin, and an expansion ratio of the foam sheet exceeds 20 times and is 100 times or less.

However, according to this car interior member, the foamed layer is allowed to be highly foamed, thereby making the degree of freedom in vibration of the non-foamed layers laminated on the foamed layer high so as to use interference effect of sounds based on the vibration of the non-foamed layers to exhibit sound absorption performance. Therefore, the following problems arise. The degree of freedom in vibration of the non-foamed layers is affected by the molded shape of the car interior member, so that the sound absorption performance is changed due to the molded shape of the car interior member. As a result, the car interior member cannot keep constant sound absorption performance. Alternatively, if the car interior member is caused to keep the constant sound absorption performance, the molded shape of the car interior member is restricted.

Patent Document 1: JP-A 2000-283482

DISCLOSURE OF THE INVENTION

Problems to be Solved by the Invention

The present invention provides a foam sheet for a car interior member which can be molded into a desired shape while keeping good sound absorption performance and, also, provides a car interior member obtained by thermally-molding this foam sheet for a car interior member.

Means for Solving The Problems

A modified polyphenylene ether-based resin which constitutes a modified polyphenylene ether-based resin foam sheet 1 of a foam sheet A for a car interior member according to the present invention is not particularly limited, and examples thereof include: a mixture of a polyphenylene ether represented by the following chemical formula 1 and a polystyrene-based resin; a modified polyphenylene ether obtained by graft-copolymerizing a styrene-based monomer with the above-mentioned polyphenylene ether; a mixture of this modified polyphenylene ether and a polystyrene-based resin; a block copolymer obtained by oxidation-polymerizing a phenol-based monomer represented by the following chemical formula 2 and a styrene-based monomer in the presence of a catalyst such as an amine complex of copper (II); a mixture of this block copolymer and a polystyrene-based resin; and the like. Herein, the modified polyphenylene ether-based resins may be used alone or in combination.

(Chemical Formula 1)

(Herein, $R_1$ and $R_2$ each represents an alkyl group having 1 to 4 carbon atoms, or a halogen atom, and n represents the degree of polymerization.)

Examples of the polyphenylene ether represented by the above chemical formula 1 include poly(2,6-dimethylphenylene-1,4-ether), poly(2,6-diethylphenylene-1,4-ether), poly(2,6-dichlorophenylene-1,4-ether), poly(2,6-dibromophenylene-1,4-ether), poly(2-methyl-6-ethylphenylene-1,4-ether), poly(2-chloro-6-methylphenylene-1,4-ether), poly(2-methyl-6-isopropylphenylene-1,4-ether), poly(2,6-di-n-propylphenylene-1,4-ether), poly(2-bromo-6-methylphenylene-1,4-ether), poly(2-chloro-6-bromophenylene-1,4-ether), poly(2-chloro-6-ethylphenylene-1,4-ether), and the like. These may be used alone or in combination. The above-mentioned degree of polymerization n is usually from 10 to 5000.

(Chemical Formula 2)

(Herein, $R_3$ and $R_4$ each represents an alkyl group having 1 to 4 carbon atoms and a halogen atom.)

Examples of the phenol-based monomer represented by the above chemical formula 2 include 2,6-dimethylphenol, 2,6-diethylphenol, 2,6-dichlorophenol, 2,6-dibromophenol, 2-methyl-6-ethylphenol, 2-chloro-6-methylphenol, 2-methyl-6-isopropylphenol, 2,6-di-n-propylphenol, 2-bromo-6-methylphenol, 2-chloro-6-bromophenol, 2-chloro-6-ethylphenol, and the like. These may be used alone or in combination.

Examples of the polystyrene-based resin mixed with the above-mentioned polyphenylene ether, modified polyphenylene ether or block copolymer include polystyrene, a copolymer made from styrene and a vinyl monomer copolymerizable therewith, high-impact polystyrene, and the like. In particular, polystyrene is preferred. The polystyrene-based resins may be used alone or in combination.

Examples of the above-mentioned vinyl monomer include methyl methacrylate, acrylonitrile, methacrylonitrile, butyl acrylate, and the like. An example of the high-impact polystyrene is a product wherein a rubber component such as styrene-butadiene copolymer or styrene-butadiene-styrene block copolymer is added to polystyrene or the above-mentioned copolymer made from styrene and a vinyl monomer copolymerizable therewith in an amount of 1 to 20% by weight.

Examples of the styrene-based monomer which is graft-copolymerized with the polyphenylene ether or block-copolymerized with the phenol-based monomer include: styrene; alkylated styrenes such as α-methylstyrene, 2,4-dimethylstyrene, p-methylstyrene, ethylstyrene, and p-t-butylstyrene; halogenated styrenes such as monochlorostyrene, and dichlorostyrene; and the like.

The modified polyphenylene ether-based resin is preferably a modified polyphenylene ether-based resin comprising 15 to 60% by weight of a phenylene ether component and 85 to 40% by weight of a styrene component, more preferably a modified polyphenylene ether-based resin comprising 20 to 60% by weight of a phenylene ether component and 80 to 40% by weight of a styrene component, and still more preferably a modified polyphenylene ether-based resin comprising 25 to 50% by weight of a phenylene ether component and 75 to 50% by weight of a styrene component. In the case that the polystyrene-based resin is mixed with the polyphenylene ether-based resin, the above-mentioned contents of the phenylene ether component and the styrene component refer to contents in the modified polyphenylene ether-based resin including the polystyrene-based resin.

This is based on the following reasons. If the phenylene ether component in the modified polyphenylene ether-based resin is small, the heat resistance of the foam sheet may lower. On the other hand, if the phenylene ether component is large, a foam sheet with good quality may not be obtained.

If an open cell ratio in the whole of the modified polyphenylene ether-based resin foam sheet 1 of the foam sheet A for a car interior member, that is, an open cell ratio in the whole of the modified polyphenylene ether-based resin foam sheet 1 in which pore portions 2 are formed (hereinafter, referred to as "perforated, modified polyphenylene ether-based resin foam sheet") is low, the sound absorbency of the foam sheet for a car interior member may lower; therefore, the ratio is limited to 50% or more and is preferably 60% or more. On the other hand, if the ratio is high, the mechanical strength of the foam sheet for a car interior member may lower; therefore, the ratio is more preferably from 60 to 90%, still more preferably from 60 to 85%.

The open cell ratio of the perforated, modified polyphenylene ether-based resin foam sheet 1 is measured in accordance with ASTM D2856-87. Specifically, the perforated, modified polyphenylene ether-based resin foam sheet 1 is cut, over the entire length of the foam sheet 1 in the thickness direction thereof, into plural sheet-like test pieces each having a planar square each side of which is 25 mm in length. The test pieces are stacked in such a manner that the entire thickness thereof becomes about 25 mm in the thickness direction thereof, thereby forming a laminate.

Next, the apparent volume of the laminate is precisely measured with vernier calipers. An air-comparison type densimeter is then used to measure the volume by the 1-1/2-1 air pressure method. The open cell ratio is calculated from the following expression. The volume of the laminate based on the 1-1/2-1 air pressure method can be measured by use of, for example, an air-comparison type densimeter commercially available as a trade name of "air-comparison type densimeter, model 1000" from Tokyo Science Co., Ltd. The apparent volume of the laminate does not include the volume of the pore portions 2, which will be described later, included in the laminate.

Open cell ratio (%) 100×(Apparent volume−Volume of the laminate by means of air-comparison type densimeter)/Apparent volume If the average cell diameter of the perforated, modified polyphenylene ether-based resin foam sheet 1 of the foam sheet A for a car interior member is small, the foam sheet 1 becomes soft so that the mechanical strength thereof may lower. On the other hand, if the diameter is large, the surface smoothness of the foam sheet 1 may lower or the sheet 1 may become brittle. Accordingly, the diameter is preferably from 0.2 to 1.3 mm, more preferably from 0.3 to 1.0 mm. The average cell diameter of the perforated, modified polyphenylene ether-based resin foam sheet 1 is measured in accordance with the test method of ASTM D2842-69.

If the density of the perforated, modified polyphenylene ether-based resin foam sheet 1 of the foam sheet A for a car interior member is small, the mechanical strength of the foam sheet for a car interior member may lower. On the other hand, if the density is large, the flexibility of the foam sheet for a car interior member may lower so as to cause problems such that the sheet is bent to be broken down. Accordingly, the density is preferably from 0.03 to 0.30 g/cm³, more preferably from 0.035 to 0.20 g/cm³. The density of the perforated, modified polyphenylene ether-based resin foam sheet 1 is measured in accordance with a method described in JIS K7222:1999 "Foamed Plastic and Rubber-Measurement of Apparent Density".

If the thickness of the perforated, modified polyphenylene ether-based resin foam sheet 1 of the foam sheet A for a car interior member is too small, the thickness of the car interior member obtained by molding the foam sheet A for a car interior member becomes small so that the sound absorbency of the car interior member may lower. On the other hand, if the thickness is large, the moldability of the foam sheet A for a car interior member may lower. Accordingly, the thickness is preferably from 2 to 10 mm, more preferably from 3 to 8 mm.

It is preferred that the foamed layer of the perforated, modified polyphenylene ether-based resin foam sheet 1 of the foam sheet A for a car interior member has an open cell layer made mainly of open cells. Examples of this modified polyphenylene ether-based resin foam sheet 1 include: (1) a foam sheet the whole of which has an open cell ratio of 50% or more wherein a foamed layer is made only of an open cell layer 1A made mainly of open cells, and (2) a foam sheet the whole of which has an open cell ratio of 50% or more wherein a foamed layer is made of closed cell layers 12 and 12 made mainly of closed cells on both faces of an open cell layer 11 made mainly of open cells.

The perforated, modified polyphenylene ether-based resin foam sheet 1 described in the item (1), the whole of which has an open cell ratio of 50% or more wherein a foamed layer is made only of an open cell layer made mainly of open cells, has in its foamed layer no closed cell layer made mainly of closed cells. The whole of the foamed layer is made of the open cell layer 1A made mainly of open cells. Non-foamed layers 13 and 13, so-called skin layers may be formed on the whole of both faces of the perforated, modified polyphenylene ether-based resin foam sheet 1.

Since this perforated, modified polyphenylene ether-based resin foam sheet 1 is wholly made of the open cells, the perforated, modified polyphenylene ether-based resin foam sheet 1 is substantially homogeneous as a whole.

Accordingly, even in the case that the foam sheet for a car interior member is compression-molded when the sheet is molded into a car interior member, the perforated, modified polyphenylene ether-based resin foam sheet 1 is molded into a desired shape while the sheet 1 is substantially evenly compressed in the thickness direction thereof. Therefore, the strength of the perforated, modified polyphenylene ether-based resin foam sheet 1 does not lower partially, so that the sheet keeps a given strength.

It is sufficient that the open cell layer 1A of the perforated, modified polyphenylene ether-based resin foam sheet 1 is made mainly of open cells. Thus, it is unnecessary that all foams therein are open cells. It is however preferred that 70% or more of the cells contained in the open cell layer 1A are open cells, that is, the open cell ratio in the open cell layer 1A is 70% or more. The open cell ratio in the open cell layer 1A is measured by the above-mentioned open cell ratio measuring method.

The following describes the perforated, modified polyphenylene ether-based resin foam sheet 1 described in the item (2), wherein its foamed layer has, at the center thereof, the open cell layer 11 made mainly of open cells and further the closed cell layers 12 and 12 made mainly of closed cells are continuously formed to be integrated with both faces of this open cell layer 11, the whole of the foam sheet having an open cell ratio of 50% or more. The open cell layer 11 and the closed cell layers 12 do not have any definite boundary in interfaces therebetween, and the open cell layer 11 and the closed cell layers 12 fall in a state that they are intermixed in interfaces therebetween. Non-foamed layers 13 and 13, so-called skin layers may be formed on the entire surfaces of the closed cell layers 12 and 12.

It is sufficient that the open cell layer 11 of the perforated, modified polyphenylene ether-based resin foam sheet 1 is made mainly of open cells. Thus, it is unnecessary that all cells therein are open cells. It is however preferred that 80% or more of the cells contained in the open cell layer 11 are open cells, that is, the open cell ratio in the open cell layer 11 is 80% or more. The open cell ratio in the open cell layer 11 is measured by the above-mentioned open cell ratio measuring method.

In the same manner, it is sufficient that each of the closed cell layers 12 of the perforated, modified polyphenylene ether-based resin foam sheet 1 is made mainly of closed cells. Thus, it is unnecessary that all cells therein are closed cells. It is however preferred that 60% or more of the cells contained in the closed cell layer 12 are closed cells, that is, the closed cell ratio in the closed cell layer 12 is 60% or more. The closed cell ratio in the closed cell layer 12 is a value obtained by subtracting, from 100(%), the open cell ratio measured by the above-mentioned open cell ratio measuring method and the occupancy ratio of the resin.

Closed cell ratio (%)=100×{(Volume of laminate by means of air-comparison type densimeter)−(Mass of laminate/Density of resin)}/Apparent volume If the thickness of each of the closed cell layers 12 of the perforated, modified polyphenylene ether-based resin foam sheet 1 is large, the sound absorbency of the foam sheet A for a car interior member may lower. Accordingly, the thickness is preferably 30% or less of the thickness of the whole of the perforated, modified polyphenylene ether-based resin foam sheet 1. If the thickness is too small, the air-blocking property of the foam sheet A for a car interior member lowers so that the air inside the car reaches the outside of the car through the foam sheet for a car interior member. Thus, dirt contained in the air falls into a state that the dirt is filtrated through a skin material 7 which is integrally laminated on the surface of the foam sheet for a car interior member and will be described later, thereby causing a problem that the dirt on the skin material 7 becomes conspicuous. Alternatively, the mechanical strength of the foam sheet A for a car interior member lowers. Therefore, the thickness is preferably from 1 to 25% thereof. When the non-foamed layer (skin layer) 13 is formed on the entire surface of each of the closed cell layers 12, the "thickness of the closed cell layer 12" is thickness including the thickness of the non-foamed layer 13.

In the present invention, the closed cells are each a cell which is wholly surrounded by a cell wall and is not connected to any different cell. The open cells are cells other than the closed cells. Specifically, the open cells are each a cell which has a cell wall having a through hole formed therein and which is communicated with a different cell through this through hole.

In the perforated, modified polyphenylene ether-based resin foam sheet 1, the distinction between the open cell layer, which is made mainly of open cells, and the closed cell layer, which is made mainly of closed cells, is determined in the following way.

First, the perforated, modified polyphenylene ether-based resin foam sheet 1 is cut, over the entire length of the sheet 1 in the thickness direction, into a sheet-like test piece having a planar square shape each side of which has a length of 40 mm.

Separately, 300 g of distilled water and 3 cm³ of aqueous red ink for a fountain pen are supplied into a beaker to prepare an aqueous red solution. The test piece is completely immersed in this aqueous red solution, at the center of the solution in the vertical direction, by pressing the test piece from the upper face thereof with a metal gauze. An example of the aqueous red ink for a fountain pen may be one commercially available as a trade name of "Pilot Ink Red" from Pilot Corp.

Thereafter, the beaker wherein the test piece is immersed is put on a pressure-reducing device, and then the pressure inside it is reduced into an internal pressure of $5.3 \times 10^4$ Pa over 30 seconds. Next, the pressure inside the pressure-reducing device is returned into normal pressure. The test piece is then taken out from the pressure-reducing device, and the aqueous red solution adhering onto the surface of the test piece is removed with a water-absorption towel.

All the cut faces of the test piece which are formed when the test piece is cut out from the foam sheet 1 are cut off. In other words, the peripheral portions in the four directions of the test piece, when being viewed from the above, are cut over the entire length of the test piece in the thickness direction thereof. That is, the peripheral portions in the four directions of the test piece are cut off from the test piece into the form of a square frame over the entire length in the thickness direction. As a result, a colored test piece in a 38 mm-square shape is cut off. Next, the coloration state of each cut face of this colored test piece is observed with a video microscope at 50 magnifications. The colored portion is regarded as the open cell layer, which is made mainly of open cells. The non-colored portion is regarded as the closed cell layer, which is made mainly of closed cells.

The thickness of the closed cell layers 12 of the perforated, modified polyphenylene ether-based resin foam sheet 1 is measured in the following way. Colored test pieces are first produced in the same way as described above from any 5 points of the perforated, modified polyphenylene ether-based resin foam sheet 1.

Next, cross sections of each of the colored test pieces are observed with a video microscope at 50 magnifications. About each of the colored test pieces, the maximum thickness and the minimum thickness of the closed cell layer 12 are measured. The arithmetic average of these thicknesses is calculated. The arithmetic averages calculated out for the respective colored test pieces are arithmetically averaged. The resultant is defined as the thickness of the closed cell layer 12 of the perforated, modified polyphenylene ether-based resin foam sheet 1. The video microscope is commercially available as, for example, a trade name of "Video Microscope VMS-300" from Scalar Corp.

As illustrated in FIGS. 1 and 4, modified polyphenylene ether-based resin sheets 3 and 3 may be integrally laminated on both faces of the perforated, modified polyphenylene ether-based resin foam sheet 1 of the foam sheet A for a car interior member. As the modified polyphenylene ether-based resin which constitutes each of the modified polyphenylene ether-based resin sheets 3, the resin equal to the modified polyphenylene ether-based resin which constitutes the foam sheet 1 is used. Preferred is a modified polyphenylene ether-based resin having 10 to 50% by weight of a phenylene ether component and 90 to 50% by weight of a styrene component. More preferred is a modified polyphenylene ether-based resin having 10 to 40% by weight of a phenylene ether component and 90 to 60% by weight of a styrene component. Still more preferred is a modified polyphenylene ether-based resin having 10 to 35% by weight of a phenylene ether component and 90 to 65% by weight of a styrene component. For reference, in the case that the polystyrene-based resin is mixed with the polyphenylene ether-based resin, the above-mentioned contents of the phenylene ether component and the styrene component refer to contents in the modified polyphenylene ether-based resin including the polystyrene-based resin.

This is based on the following reasons. If the content of the phenylene ether component in the modified polyphenylene ether-based resin is small, the heat resistance and the rigidity of the modified polyphenylene ether-based resin sheet 3 may lower. If the content is large, the fluidity of the melted resin lowers so that the extrusion-moldability thereof lowers.

It is allowable to incorporate a recovered product of the foam sheet A for a car interior member into the modified polyphenylene ether-based resin which constitutes the modified polyphenylene ether-based resin sheet 3. In this case, it is preferred that 100 parts or less by weight of the recovered product of the foam sheet A for a car interior member are for 100 parts by weight of the modified polyphenylene ether-based resin. This is because if an excessive amount of the recovered product of the foam sheet A for a car interior member is incorporated into the modified polyphenylene ether-based resin sheet 3, mechanical strengths of the modified polyphenylene ether-based resin sheet 3, such as the bending strength thereof, may lower.

Furthermore, it is preferred that the glass transition temperature Tg of the modified polyphenylene ether-based resin which constitutes the modified polyphenylene ether-based resin sheet 3 is 10 to 40° C. lower than the glass transition temperature Tg of the modified polyphenylene ether-based resin which constitutes the perforated, modified polyphenylene ether-based resin foam sheet 1.

This is based on the following reason. The cell film of the perforated, modified polyphenylene ether-based resin foam sheet 1 has a small thickness. Therefore, the cell film is easily melted and deformed by action of a small calorie in comparison with the modified polyphenylene ether-based resin sheet 3 made of the same material as that of the foam sheet 1. As a result, cells in the surface region of the foam sheet 1 are collapsed by molding pressure.

On the other hand, the modified polyphenylene ether-based resin sheets 3 integrally laminated on both faces of the perforated, modified polyphenylene ether-based resin foam sheet 1 is excellent in form keeping property rather than the foam sheet 1 since the sheets 3 contain no cells and further have a much larger thickness than the cell film of the foam sheet 1.

Thus, the glass transition temperature Tg of the modified polyphenylene ether-based resin which constitutes each of the modified polyphenylene ether-based resin sheets 3 is made lower than the glass transition temperature Tg of the modified polyphenylene ether-based resin which constitutes the perforated, modified polyphenylene ether-based resin foam sheet 1, thereby making the heat resistance of the perforated, modified polyphenylene ether-based resin foam sheet 1 excellent rather than that of the modified polyphenylene ether-based resin sheet 3. This prevents the cells in the surface region of the foam sheet 1 from being collapsed due to molding pressure under heating by molding heat when the foam sheet A for a car interior member is molded, thereby making it possible to yield a molded product having a desired thickness.

A coloring agent may be incorporated into the modified polyphenylene ether-based resin sheet 3. Such a coloring agent is not particularly limited. Examples thereof include: inorganic fillers such as carbon black, titanium oxide, zinc oxide, iron oxide and aluminum oxide; pigments such as cyanine blue, cyanine green, milori blue, threne blue, cadmium red, cadmium yellow, cadmium orange, Bengal, ultramarine blue, and phthalocyanine blue; and the like. Preferred are coloring agents which exhibit a dark color such as black or gray. More preferred is carbon black.

A rubber component may be added to the modified polyphenylene ether-based resin sheet 3 in order to prevent embrittlement. Examples of such a rubber component include high-impact polystyrene, styrene-butadiene copolymer, styrene-butadiene-styrene block copolymer, and the like. High-impact polystyrene is preferred.

If the content of the rubber component in the modified polyphenylene ether-based resin sheet 3 is small, the effect of preventing the embrittlement of the modified polyphenylene ether-based resin sheet 3 may not be expressed. On the other hand, if the content is large, the bending strength or the rigidity of the modified polyphenylene ether-based resin sheet 3 may lower. Accordingly, it is preferred that 1 to 20 parts by weight of the rubber component is for 100 parts by weight of the modified polyphenylene ether-based resin.

The modified polyphenylene ether-based resin sheets 3 and 3 are firmly, integrally laminated on both faces of the perforated, modified polyphenylene ether-based resin foam sheet 1 directly, without interposing any adhesive layer therebetween, by action of thermal fusion between the modified polyphenylene ether-based resin which constitutes the perforated, modified polyphenylene ether-based resin foam sheet 1 and the modified polyphenylene ether-based resin which constitutes each of the modified polyphenylene ether-based resin sheets 3.

In other words, the modified polyphenylene ether-based resin sheet 3 and the perforated, modified polyphenylene ether-based resin foam sheet 1 are firmly integrated with each other by action of thermal fusion between the modified polyphenylene ether-based resins which constitute the two sheets. Thus, it is possible to mold the foam sheet A for a car interior member precisely and surely into a complicated form without peeling off the modified polyphenylene ether-based resin sheet 3 from the surface of the perforated, modified polyphenylene ether-based resin foam sheet 1.

If the thickness of the modified polyphenylene ether-based resin sheets 3 is small, the mechanical strength of the foam sheet A for a car interior member may lower. On the other hand, if the thickness is large, the moldability and the lightness of the foam sheet A for a car interior member may lower. Accordingly, the thickness is preferably from 50 to 300 μm, more preferably from 70 to 200 μm.

As illustrated in FIGS. 1 to 4, pore portions 2, 2 . . . are formed in the modified polyphenylene ether-based resin foam sheet 1. The pore portions 2, 2 . . . are open to a surface 1a of the sheet 1 or a surface 3a of one of the modified polyphenylene ether-based resin sheets 3 and further reach the open cell layer 11 or 1A. In this way, the foam sheet A for a car interior member is constructed.

When a great number of the pore portions 2 are formed in this way, the vibration energy of sounds generated at the open side of the pore portions 2 is smoothly induced through the pore portions 2 to the inside of the foam sheet 1, so as to vibrate cell walls of the open cells in the foam sheet 1 so that the vibration energy of the sounds is converted to thermal energy so as to be absorbed. In this way, the reflection of the sounds on the foam sheet A for a car interior member is effectively prevented to give an excellent sound absorbency to the foam sheet A for a car interior member.

First, in the case that the perforated, modified polyphenylene ether-based resin foam sheet 1 is a foam sheet the whole of which has an open cell ratio of 50% or more wherein its foamed layer is made only of the open cell layer 1A, which is made mainly of open cells, it is sufficient that the pore portions 2 reach the open cell layer 1A of the foam sheet 1 in the state that the pore portions 2 are open to the surface 1a of the modified polyphenylene ether-based resin foam sheet or are open to one of the surfaces 3a of the modified polyphenylene ether-based resin sheets integrally laminated on both faces of the modified polyphenylene ether-based resin foam sheet 1 (see FIGS. 1 and 3).

The depth of the pore portions 2 is not particularly limited. If the depth of the pore portions 2 is small, the vibration energy of sounds is not efficiently induced to the inside of the open cells in the open cell layer so that the sound absorbency of the foam sheet A for a car interior member may lower. On the other hand, if the depth is large, it is feared that when the pore portions 2 are formed in the foam sheet 1, through holes are erroneously formed in the foam sheet 1, or the mechanical strength of the foam sheet A for a car interior member may lower. Accordingly, the depth is preferably from 10 to 95%, more preferably from 30 to 90% of the thickness of the perforated, modified polyphenylene ether-based resin foam sheet 1.

Next, in the case that the perforated, modified polyphenylene ether-based resin foam sheet 1 is a foam sheet the whole of which has an open cell ratio of 50% or more wherein its foamed layer is composed of closed cell layers 12 and 12 made mainly of closed cells on both faces of the open cell layer 11, which is made mainly of open cells, it is sufficient the pore portions 2 penetrate the closed cell layer 12a (and a skin 13a) in the modified polyphenylene ether-based resin foam sheet 1, so as to reach the open cell layer 11 of the foam sheet 1 in the state that the pore portions 2 are open to the surface 1a of the modified polyphenylene ether-based resin foam sheet 1 or are open to the surface 3a of the modified polyphenylene ether-based resin sheets 3 integrally laminated on both faces of the modified polyphenylene ether-based resin foam sheet 1. Thus, the pore portions 2 may or may not reach the other closed cell layer 12b of the modified polyphenylene ether-based resin foam sheet 1.

In other words, as illustrated in FIGS. 2 and 4, the pore portions 2 are formed in the state that bottoms 21 of the pore portions 2 reach the interface between the open cell layer 11 and the closed cell layer 12a in the modified polyphenylene ether-based resin foam sheet 1. Alternatively, as illustrated in FIGS. 5 and 6, the pore portions 2 are formed in the state that bottoms 21 of the pore portions 2 penetrate the inside of the open cell layer 11 of the modified polyphenylene ether-based resin foam sheet 1, preferably in a state as illustrated FIGS. 7 and 8, i.e., a state that bottoms 21 of the pore portions 2 reach the interface between the open cell layer 11 and the other closed cell layer 12b in the modified polyphenylene ether-based resin foam sheet 1.

Since the vibration energy of sounds can be smoothly induced into the open cell layer 11 of the foam sheet 1 through the pore portions 2, it is preferred that the bottoms 21 of the pore portions 2 penetrate the inside of the open cell layer 11 of the modified polyphenylene ether-based resin foam sheet 1. It is more preferred that the bottoms 21 of the pore portions 2 reach the interface between the open cell layer 11 and the other closed cell layer 12b in the modified polyphenylene ether-based resin foam sheet 1.

The shape of opening ends of the pore portions 2 formed in the modified polyphenylene ether-based resin foam sheet 1 is not particularly limited as long as the shape makes it possible to induce the vibration energy of sounds into the open cells in the foam sheet 1. Preferred examples thereof include polygons such as a triangle and a rectangle besides a completely round shape and an elliptic shape. A completely round shape is preferred.

The sectional shape of the pore portions 2 along the surface of the foam sheet A for a car interior member may be the same shape, which is not varied over the entire length in the depth direction thereof, or may be varied in the depth direction.

If the opening end area of the pore portions 2 is small, the sound absorbency of the foam sheet A for a car interior member may lower. If the area is large, the mechanical strength of the foam sheet A for a car interior member may lower. Accordingly, the area is preferably from 0.2 to 40 mm$^2$, more preferably from 0.3 to 30 mm$^2$.

The form of the pore portions 2 is not particularly limited. The mechanical strength of the foam sheet A for a car interior member may become uneven; it is therefore preferred that the pore portions 2 are evenly formed. As illustrated in FIG. 9, it is more preferred that pore portions 2a, 2a . . . having opening ends having the same diameter and a completely round shape are formed in respective intersection points 41, 41 . . . of an imaginary lattice 4 drawn on the surface 1a of the modified polyphenylene ether-based resin sheet 1 or on the surface 3a of the modified polyphenylene ether-based resin sheet 3 in the state that the intersection points 41, 41 . . . are consistent with centers 21a, 21a . . . of the pore portions 2a and further completely round pore portions 2b, 2b . . . the opening ends of which have the same diameter as the pore portions 2a, are made in the state that centers 21b and 21b thereof are consistent with respective intersection portions 42a, 42a . . . of diagonal lines of square frames 42 of the imaginary lattice 4, thereby forming the pore portions 2, 2 (2a, 2a) . . . into a staggered shape. Only the pore portions 2a may be formed without forming the pore portions 2b.

If the ratio of the total opening area of the pore portions 2 to the surface of the foam sheet A for a car interior member is small, the sound absorbency of the foam sheet A for a car interior member may lower. On the other hand, if the ratio is large, the mechanical strength of the foam sheet A for a car interior member may lower. Accordingly, the ratio is preferably from 2 to 50%, more preferably from 3 to 50%, still more preferably from 3 to 40%.

The ratio of the total opening area of the pore portions 2 to the surface of the foam sheet A for a car interior member is measured in the following way. A measuring frame having a planar square shape each side of which is 10 cm in length is fixed at any position in the surface 1a (3a) of the foam sheet A for a car interior member.

The summation of opening end areas of the pore portions 2 present inside this measuring frame is obtained. The percentage of the summation of the opening areas of the pore portions 2 to the area of the measuring frame is calculated. The value of this percentage is defined as the ratio of the total opening area of the pore portions 2 to the surface of the foam sheet A for a car interior member. When each opening end of the pore portions 2 is partially present in the measuring frame, only the area of the opening end of the pore portions 2 which is present in the measuring frame is a target.

Specifically, as illustrated in FIG. 10, in the case that the pore portions 2 having completely round opening ends are formed into a staggered shape, it is advisable to fix, for example, a measuring frame 43 having a planar square shape along the imaginary frame 4 to hold therein plural ones out of the pore portions 2, calculate the summation (hatched area) of the opening end areas of the pore portions 2 present inside this measuring frame 43, and then calculate the percentage of the summation of the opening end areas of the pore portions 2 to the area of the measuring frame 43.

When the foam sheet for a car interior member is secondarily foamed to prepare a molded product, it is sufficient that the opening end shape, the opening end area and the total opening area ratio of the pore portions 2 in the secondarily foamed, molded product satisfy the above-mentioned conditions. At such a time, it is not necessarily essential that the pore portions 2 in the foam sheet for a car interior member satisfy the above-mentioned opening end shape, opening end area and total opening area ratio before the sheet is secondarily foamed.

As illustrated in FIGS. 11 to 14, one or two surface sheets 5 and 5 may be integrally laminated on the face wherein the pore portions 2 are formed in the foam sheet A for a car interior member (hereinafter, referred to as the "pore-portion formation face"), preferably on both faces of the foam sheet A for a car interior member. When the surface sheet 5 is integrally laminated on the foam sheet A for a car interior member, it is preferred that the modified polyphenylene ether-based resin sheet 3 is not integrally laminated on the modified polyphenylene ether-based resin foam sheet 1.

When the surface sheets 5 and 5 are integrally laminated on both faces of the foam sheet A for a car interior member, the kinds of the two surface sheets 5 and 5 may be the same or different. It is preferred that the kinds are the same since the foam sheet A for a car interior member may be warped when the sheet A is produced.

Each of the surface sheets 5 contains form-keeping fibers and thermoplastic resin fibers. The form-keeping fiber which constitutes the surface sheet 5 is a fiber the form of which is kept without being melted when the foam sheet A for a car interior member is thermally molded. The fiber is preferably at least one fiber selected from the group consisting of glass fiber, carbon fiber, basalt fiber, and natural fiber, and is more preferably natural fiber.

The natural fiber is not particularly limited, and examples thereof include: grass fibers made from straw, esparto, reed, bamboo, bagasse (strained lees of sugar cane), and papyrus; leaf vein fibers made from manila hemp, sisal hemp, and pineapple leaves; bast fibers made from hemp, flax, jute, china ramie, mulberry, kenaf, Broussonetia Kazinoki Sieb, paper-bush, and Diplomorpha sikokiana Honda; seed fibers made from linters and kapok; woody fibers made from pine, Japanese larch, Japanese cedar, Japanese cypress, Japanese silver fir, Japanese/Siebold hemlock, Honda spruce, Japanese/Siebold's beech, maple, birch, Japanese alder, Japanese elm, paulownia, and chestnut tree; and the like. The leaf vein fibers and the bast fibers are preferred. Hemp fibers are more preferred. Sisal hemp and kenaf are still more preferred.

If the length of the form-keeping fiber is large, the following is caused at the time of mixing this fiber with the thermoplastic resin fiber to prepare a nonwoven cloth: the distribution in the form-keeping fiber becomes uneven so that the thickness of the surface sheet becomes uneven. When the foam sheet A for a car interior member which the surface sheet having such an uneven thickness is integrally laminated on is thermally molded, excessive heat is applied to the modified polyphenylene ether-based resin foam sheet 1 at the thin region of the surface sheet (the region where the amount of the form-keeping fiber is insufficient) so that foamed cells in the modified polyphenylene ether-based resin foam sheet 1 are shrunk or broken. Consequently, the thickness of the foam sheet A for a car interior member becomes uneven or the mechanical strength thereof falls. Thus, if the thermally-molding temperature for the foam sheet A for car a interior member is made low to prevent the foamed cells in the modified polyphenylene ether-based resin foam sheet 1 from being shrunk or broken, strain is generated in the resultant car interior member since the heating is insufficient. Thus, there is caused a problem that the dimensional stability of the car interior member falls. Accordingly, the length is preferably 200 mm or less. If the length is too small, at regions which are elongated at the time of molding the foam sheet A for a car interior member, the surface sheet does not follow the elongation. Thus, the surface sheet may be broken. Alternatively, the rigidity of the foam sheet A for a car interior member lowers. Thus, when the sheet A is fitted to a car, the sheet A may be broken. Furthermore, the dimensional stability of the foam sheet A for a car interior member may lower at high temperatures. Accordingly, the length is preferably from 20 to 200 mm. Specifically, when the form-keeping fiber is natural fiber, the length thereof is preferably 100 mm or less. When it is carbon fiber, the length is preferably 200 mm or less.

If the diameter of the form-keeping fiber is small, the rigidity of the foam sheet A for a car interior member may lower. On the other hand, if the diameter is large, the form-keeping fiber may not be evenly distributed into the surface sheet. Thus, the diameter is preferably from 5 to 300 μm.

If the content of the form-keeping fiber in the surface sheet 5 is small, the mechanical strength of the foam sheet A for a car interior member or the dimensional stability thereof may lower. On the other hand, if the content is large, the degree of bonding between the form-keeping fibers lowers so that the moldability or external appearance of the foam sheet A for a car interior member may deteriorate. Accordingly, the content is preferably from 20 to 90% by weight, more preferably from 40 to 80% by weight.

The thermoplastic resin fibers contained in the nonwoven cloth which constitutes the surface sheet 5 are not particularly limited as long as they can be bonded to each other. Examples thereof include: a mono-layered fiber, such as polyvinyl alcohol-based fiber, polyamide-based fiber, polyacrylic-based fiber, polyacrylonitrile-based fiber, polyester-based fiber, polyethylene-based fiber, polypropylene-based fiber, and polystyrene-based fiber; a bi-layered fiber, such as a core/sheath fiber having core and sheath portions both of which are made of a polyethylene terephthalate-based resin wherein the melting point of the polyethylene terephthalate-based resin constituting the sheath portion is lower than that of the polyethylene terephthalate-based resin constituting the core portion, a core/sheath fiber having a core portion made of a polyethylene terephthalate-based resin and a sheath portion made of a polyethylene-based resin, or a core/sheath fiber having a core portion made of a polyethylene terephthalate-based resin and a sheath portion made of a polypropylene-based resin; and the like.

The above-mentioned mono-layered fiber is preferably a polyester-based fiber, more preferably a polyethylene terephthalate-based fiber, and still more preferably a polyethylene terephthalate resin.

The bi-layered fiber may be a core/sheath fiber wherein its core portion and sheath portions are made of different resins, and is preferably a core/sheath fiber having core and sheath portions both of which are made of a polyethylene terephthalate-based resin wherein the melting point of the polyethylene terephthalate-based resin constituting the sheath portion is lower than that of the polyethylene terephthalate-based resin constituting the core portion. The bi-layered fiber is more preferably a core/sheath fiber having core and sheath portions both of which are made of polyethylene terephthalate wherein the melting point of the polyethylene terephthalate constituting the sheath portion is lower than that of the polyethylene terephthalate constituting the core portion.

If the length of the thermoplastic resin fiber is small, the following-property of the surface sheet lowers when the foam sheet A for a car interior member is molded. Consequently, the surface sheet may be broken in a region where the surface sheet is extended. On the other hand, if the length is large, the distribution of the form-keeping fiber in the surface sheet may become uneven. Accordingly, the length is preferably from 4 to 80 mm, more preferably from 4 to 60 mm. The fiber diameter of the thermoplastic resin fiber is preferably from 1 to 20 deniers from the viewpoint of the bonding property thereof to the form-keeping fiber.

The melting point Tm (° C.) of the thermoplastic resin fiber and the glass transition temperature Tg (° C.) of the modified polyphenylene ether-based resin which constitutes the modified polyphenylene ether-based resin foam sheet 1 preferably satisfy the following expression 1, more preferably satisfy the following expression 2, and still more preferably satisfy the following expression 3.

$$Tg-65°\ C. < Tm < Tg+40°\ C. \qquad \text{Expression 1}$$

$$Tg-55°\ C. < Tm < Tg+30°\ C. \qquad \text{Expression 2}$$

$$Tg-45°\ C. < Tm < Tg+20°\ C. \qquad \text{Expression 3}$$

This is based on the following reasons. If the melting point Tm of the thermoplastic resin fiber is low, the dimensional stability of the foam sheet for a car interior member lowers. Thus, when the inside of a car falls into a high-temperature state in summer, the foam sheet for a car interior member may deform. On the other hand, if the melting point Tm is high, the moldability of the foam sheet for a car interior member lowers. Thus, when the foam sheet for a car interior member is molded into a complicated shape, the foam sheet for a car interior member may rupture.

In the present invention, the glass transition temperature Tg of the modified polyphenylene ether-based resin which constitutes the foam sheet A for a car interior member is measured by the method described in JIS K7121:1987 "Method for Measuring Transition Temperature of Plastic". Specifically, the temperature Tg can be measured using a differential scanning calorimeter commercially available as a trade name of "DSC 2000 Model" from Seiko Instruments Ltd. at a temperature-raising rate of 10° C./min.

If the content of the thermoplastic resin fiber in the surface sheet 5 is small, the degree of bonding between the form-keeping fibers lowers so that the moldability or external appearance of the foam sheet A for a car interior member may lower. On the other hand, if the content is large, the mechanical strength of the foam sheet A for a car interior member or the dimensional stability thereof may deteriorate. Accordingly, the content is from 10 to 80% by weight, more preferably from 20 to 60% by weight.

If the weight per unit area of the nonwoven cloth which constitutes the surface sheet 5 is small, the rigidity of the foam sheet A for a car interior member may lower. On the other hand, if the weight per unit area thereof is large, the lightness of the foam sheet A for a car interior member may lower. Accordingly, the weight per unit area thereof is preferably from 30 to 200 g/m$^2$, more preferably from 40 to 120 g/m$^2$.

If the thickness of the nonwoven cloth which constitutes the surface sheet 5 is small, the rigidity of the foam sheet A for a car interior member may lower. On the other hand, if the thickness is large, the moldability of the foam sheet A for a car interior member may lower. Accordingly, the thickness is preferably from 0.1 to 1 mm, more preferably from 0.2 to 0.8 mm.

The nonwoven cloth which constitutes the surface sheet 5 may be a nonwoven cloth produced by use of any production process that has been hitherto used. Examples of such a production process include dry processes such as chemical bond, thermal bond, and needle punch methods, and wet processes such as a papermaking process.

The method for integrally laminating the surface sheet 5 on the pore-portion formation face 1a or 3a of the foam sheet A for a car interior member may be a method of integrally laminating the surface sheet 5 on the foam sheet A for a car interior member by thermal fusion force between the modified polyphenylene ether-based resin which constitutes the foam sheet A for a car interior member and the thermoplastic resin fiber which constitutes the surface sheet 5, or a method of interposing, between the foam sheet A for a car interior member and the surface sheet 5, an adhesive layer 6 bondable to the two sheets.

When the foam sheet A for a car interior member and the surface sheet 5 are integrated with each other through the interposed adhesive layer 6, it is preferred from the viewpoint of the sound absorbency of the foam sheet A for a car interior member that the openings of the pore portions 2 in the foam sheet A for a car interior member are made not to be blocked with the adhesive layer 6.

The adhesive which constitutes the adhesive layer 6 is not particularly limited as long as the adhesive makes it possible to integrate the foam sheet A for a car interior member and the surface sheet 5 with each other. Examples thereof include: thermoplastic adhesives such as vinyl acetate-based adhesives, cellulose-based adhesives, acrylic-based adhesives, styrene-butadiene copolymer rubber-based adhesives, polyamide-based adhesives, polyvinyl acetate-based adhesives, polyester-based adhesives and acrylic-based adhesives; thermosetting adhesives such as urethane-based adhesives, melamine-based adhesives, phenolic-based adhesives, and epoxy-based adhesives; rubber-based adhesives such as chloroprene rubber-based adhesives, nitrile rubber-based adhesives and silicone rubber-based adhesives; natural substance-based adhesives such as starch, protein and natural rubber; hot melt adhesives such as polyolefin-based, modified polyolefin-based, polyurethane-based, ethylene-vinyl acetate copolymer-based, polyamide-based, polyester-based, thermoplastic rubber-based, styrene-butadiene copolymer-based, and styrene-isoprene copolymer-based hot melt adhesives; and the like. The hot melt adhesives are preferred.

As illustrated in FIG. 11, it is sufficient that the adhesive layer 6 is interposed at least between opposite faces of the foam sheet A for a car interior member and the surface sheet 5. As illustrated in FIG. 15, it is preferred that the adhesive which constitutes this adhesive layer 6 penetrates into the surface sheet 5 with the permeability of the surface sheet 5 being kept, so as to be infiltrated into the whole of the surface sheet 5. In other words, it is preferred that an adhesive 61 identical with the adhesive which constitutes the adhesive layer 6 is infiltrated into the whole of the surface sheet 5 in the state that the permeability of the surface sheet 5 is kept and the adhesive 61 infiltrated into the surface sheet 5 is integrated with the adhesive layer 6 preferably over the whole of the interface between the surface sheet 5 and the adhesive layer 6.

When the adhesive which constitutes the adhesive layer 6 is infiltrated into the whole of the surface sheet 5 in this way, the degree of bonding between the fibers which constitutes the surface sheet 5 is improved to make it possible to lower the linear expansion coefficient of the foam sheet A for a car interior member and further improve the strength of the foam sheet A for a car interior member.

As illustrated in FIG. 16, in the case of causing the adhesive infiltrated into the surface sheet 5 to ooze out to the outer face of the surface sheet 5, preferably the whole of the outer face of the surface sheet 5, so as to form a skin adhesive layer 62 on the surface of the surface sheet 5, a skin material 7 or an abnormal sound preventing material 8, which will described later, can be integrally laminated on the surface sheet 5 of the foam sheet A for a car interior member without preparing any adhesive separately at the time of the integral lamination. Thus, this case is preferred from the viewpoint of work efficiency.

If the amount of the adhesive infiltrated into the surface sheet 5 is small, the strength of the surface sheet 5 may not be improved. On the other hand, if the amount is large, the lightness of the foam sheet A for a car interior member may lower. Accordingly, the amount is preferably from 10 to 100 parts by weight for 100 parts by weight of the total of the form-keeping fiber and the thermoplastic resin fiber.

If the linear expansion coefficient of the foam sheet A for a car interior member is large, the foam sheet A for a car interior member may be warped by temperature change inside the car. Accordingly, the coefficient is preferably $20\times10^{-6}/°$ C. or less, more preferably $15\times10^{-6}/°$ C. or less, still more preferably $12\times10^{-6}/°$ C. or less.

The linear expansion coefficient of the foam sheet A for a car interior member is measured in the following way. Specifically, the foam sheets A for a car interior member is heated until the surface temperature thereof becomes a temperature 8° C. higher than the glass transition temperature of the modified polyphenylene ether-based resin which constitutes its foam sheet 1. In this way, the foam sheet A is secondarily foamed without restraint.

When the surface temperature of the foam sheet A for a car interior member becomes the temperature, which is 8° C. higher than the glass transition temperature of the modified polyphenylene ether-based resin which constitutes the foam sheet, the heating of the foam sheet A for a car interior member is finished. The thickness of the foam sheet A for a car interior member, subjected to the secondary foaming, is then measured. This manner is repeated 3 times. Thus, the arithmetic average of the thicknesses of the aforementioned three sheets is defined as the post-secondary-foaming thickness.

Next, another body of the foam sheet A for a car interior member is heated until the surface temperature thereof becomes a temperature 8° C. higher than the glass transition temperature of the modified polyphenylene ether-based resin which constitutes its foam sheet 1. Thereafter, this foam sheet A for a car interior member is arranged between a pair of planar molds the opposite faces of which are made smooth, and then the planar molds are closed to compression-mold the foam sheet A for a car interior member in the thickness direction thereof until the thickness becomes 90% of the post-secondary-foaming thickness while the foam sheet A is cooled. When the surface temperature of the foam sheet A for a car interior member becomes less than the glass transition temperature of the modified polyphenylene ether-based resin which constitutes the foam sheet 1, the pair of planar molds are opened and then the compression-molded foam sheet A for a car interior member is taken out.

A first test piece and a second test piece which are each in the form of a rectangle having long sides 300 mm in length and short sides 40 mm in length are cut out from the compression-molded foam sheet A for a car interior member in the state that the directions along their short sides cross at right angles.

Next, the first and second test pieces are left as they are in a thermostat of 85° C. temperature over 24 hours, and then they are cooled to ambient temperature. A pair of parallel straight lines are drawn at an interval of 280 mm on the surface of each of the test pieces in the direction along the long sides thereof.

Subsequently, each of the test pieces is left as it is in the thermostat of 80° C. temperature over 6 hours, and then the test pieces are taken out from the thermostat. Immediately, the distance $L_{80}$ between the pair of straight lines drawn in the surface of each of the test pieces is measured.

Next, each of the test pieces is left as it is in the thermostat of 0° C. temperature over 6 hours, and then the pieces are taken out from the thermostat. Immediately, the distance $L_0$ between the pair of straight lines drawn in the surface of each of the test pieces is measured. The linear expansion coefficients of the first and second test pieces are calculated out from the following equation. The arithmetic average of the linear expansion coefficients of the first and second test pieces is defined as the linear expansion coefficient of the foam sheet A for a car interior member.

Linear expansion coefficient $(/° C.) = (L_{80}-L_0)/(L_0\times80)$

In the case that the foam sheet 1 is a foam sheet produced by extrusion foaming, first and second test pieces are cut out from the foam sheet A for a car interior member in the state that the short side direction of the first test piece and the long side direction of the second test piece are made consistent with the extrusion direction of the foam sheet 1.

The following will describe a process for producing the foam sheet A for a car interior member. First, the process for producing a modified polyphenylene ether-based resin foam sheet wherein pore portions are not yet formed (hereinafter, referred to as an "unprocessed, modified polyphenylene ether-based resin foam sheet") may be a production process that has been hitherto used. An unprocessed, modified polyphenylene ether-based resin foam sheet having a desired open cell ratio can be yielded by adjusting the extrusion foaming temperature of a modified polyphenylene ether-based resin, the temperature of a mold attached to an extruder, or the surface-cooling degree of the foam sheet immediately after the resin is extruded from this mold.

Specific examples of the above-mentioned process for producing an unprocessed, modified polyphenylene ether-based resin foam sheet include: (1) a foam sheet producing process of supplying a modified polyphenylene ether-based resin into an extruder, melting and kneading the resin while putting a volatile foaming agent into the extruder under pressure, and then extruding the resin from a mold attached to the extruder so as to foam the resin; (2) a foam sheet producing process of supplying a modified polyphenylene ether-based resin into an extruder in the state that a volatile foaming agent is beforehand infiltrated into the resin, melting and kneading the resin, and extruding the resin from a mold attached to the extruder so as to foam the resin; and the like.

The volatile foaming agent is not particularly limited as long as the agent is a volatile foaming agent that has been hitherto used. Examples thereof include: organic foaming agents such as ethane, propane, isobutene, n-butane, pentane, and dimethyl ether; and inorganic foaming agents such as carbon dioxide, water and nitrogen. These may be used alone or in combination.

It is preferred to adjust the kind or the amount of the volatile foaming agent so as to set the amount of the residual foaming agent remaining in the perforated, modified polyphenylene ether-based resin foam sheet 1 into the range from 0.3 to 4.0% by weight. This is based on the following reasons. If the amount of the residual foaming agent in the perforated, modified polyphenylene ether-based resin foam sheet 1 is small, the foam sheet 1 can not have a good quality. In contrast, if the amount is large, the heat resistance and the dimensional stability of the foam sheet 1 may deteriorate.

In the case that the modified polyphenylene ether-based resin sheets 3 and 3 are integrally laminated on both faces of the unprocessed, modified polyphenylene ether-based resin foam sheet 1 yielded as described above, the method for integrally laminating the modified polyphenylene ether-based resin sheets on both faces of the unprocessed, modified polyphenylene ether-based resin foam sheet may be, for example, (1) a method of stacking the modified polyphenylene ether-based resin sheets onto both faces of the unprocessed, modified polyphenylene ether-based resin foam sheet and then thermally melting the sheets onto both faces of the foam sheet with heating rolls so as to integrate the sheets with the foam sheet, (2) a method of laminating the modified polyphenylene ether-based resin sheets immediately after the sheets are extruded from an extruder onto both faces of the unprocessed, modified polyphenylene ether-based resin foam sheet, and then integrally laminating this sheet on the surface of the unprocessed, modified polyphenylene ether-based resin foam sheet by thermal fusion, or (3) a method of integrally laminating the modified polyphenylene ether-based resin sheets onto both faces of the unprocessed, modified polyphenylene ether-based resin foam sheet by co-extrusion.

The pore portions 2 are formed in the unprocessed, modified polyphenylene ether-based resin foam sheet obtained as described above so as to produce the foam sheet A for a car interior member. The method for forming the pore portions 2 in the unprocessed, modified polyphenylene ether-based resin foam sheet is not particularly limited, and may be, for example, (1) a method of supplying the unprocessed, modified polyphenylene ether-based resin foam sheet or the unprocessed, modified polyphenylene ether-based resin foam sheet having both faces which the modified polyphenylene ether-based resin sheets are integrally laminated on between a pair of rolls having rotating axes arranged in parallel to each other at a given interval, a large number of pins being planted on the surface of one of the rolls, and then sticking the pins into one of the faces of the unprocessed, modified polyphenylene ether-based resin foam sheet so as to go from this face to the open cell layer 11 (1A) of the foam sheet, thereby forming the pore portions 2, 2 . . . numerously, or (2) a method of pressing a flat plate wherein a great number of pins are planted onto one of the faces of the unprocessed, modified polyphenylene ether-based resin foam sheet or the unprocessed, modified polyphenylene ether-based resin foam sheet having both faces which the modified polyphenylene ether-based resin sheets are integrally laminated on, so as to stick the pins into one of the faces of the unprocessed, modified polyphenylene ether-based resin foam sheet so as to go from this face to the open cell layer 11 (1A) of the foam sheet, thereby forming the pore portions 2, 2 . . . numerously.

The method for integrally laminating the surface sheet 5 on at least the pore-portion formation face of the foam sheet A for a car interior member produced as described above may be, for example, (1) a method of laminating the nonwoven cloth which constitutes the surface sheet 5 on at least the pore-portion formation face of the foam sheet A for a car interior member in the state that the adhesive which constitutes the adhesive layer 6 is interposed therebetween to produce a laminate, and then heating and pressing this laminate in the thickness direction thereof from both sides of the laminate to integrally laminate the surface sheet 5 on at least the pore-portion formation face of the foam sheet A for a car interior member, or (2) a method of applying the adhesive which constitutes the adhesive layer 6 onto one face of the nonwoven cloth which constitutes the surface sheet 5, laminating the nonwoven cloth on at least the pore-portion formation face of the foam sheet A for a car interior member so as to direct the adhesive-applied face of the cloth toward the foam sheet A for a car interior member so as to produce a laminate, and then heating and compressing this laminate in the thickness direction thereof from both sides of the laminate, thereby integrally laminating the surface sheet 5 on at least the pore-portion formation face of the foam sheet A for a car interior member. In each of the production methods (1) and (2), it is preferred to make an adjustment in such a manner that opening areas of the pore portions 2 in the foam sheet A for a car interior member are not blocked with the adhesive layer 6.

At the time of producing the foam sheet A for a car interior member wherein the adhesive which constitutes the adhesive layer 6 is infiltrated into the whole of the surface sheet 5 (see FIG. 15), or the foam sheet A for a car interior member wherein the adhesive which constitutes the adhesive layer is infiltrated into the whole of the surface sheet 5 and further the adhesive infiltrated into the surface sheet 5 is caused to ooze out to the outer face of the surface sheet 5 to form the skin adhesive layer 62 on the surface of the surface sheet 5 (see FIG. 16), it is advisable to infiltrate the adhesive beforehand into the whole of the nonwoven cloth which constitutes the surface sheet 5, and use this adhesive infiltrated into the nonwoven cloth to integrally laminate the surface sheet 5 on the pore-portion formation face of the foam sheet A for a car interior member. In this production process also, it is preferred to adjust the pore portions 2 to keep the permeability to the outside.

Examples of the method for infiltrating the adhesive into the nonwoven cloth which constitutes the surface sheet 5 include: (1) a method of arranging the adhesive onto the nonwoven cloth which constitutes the surface sheet 5 and heating and compressing this nonwoven cloth, on which the adhesive is arranged in the thickness direction thereof, thereby melting the adhesive so as to be infiltrated into the nonwoven cloth; (2) a method of applying/infiltrating the adhesive into the nonwoven cloth which constitutes the surface sheet 5 by an ordinary method such as spray coating or roll coating; (3) a method of immersing the nonwoven cloth which constitutes the surface sheet 5 into an emulsion containing the adhesive, thereby infiltrating the adhesive into the nonwoven cloth; and the like. When the nonwoven cloth which constitutes the surface sheet 5 is produced by a wet process, the above-mentioned method may be, for example, (4) a method of incorporating the adhesive into water when the cloth is produced by a paper-making method, thereby infiltrating the adhesive into the nonwoven cloth at the same time when the nonwoven cloth is produced. In each of the methods, it is preferred to make an adjustment in such a manner that the permeability of the nonwoven cloth, into which the adhesive is infiltrated, can be kept.

When the adhesive is infiltrated into the nonwoven cloth which constitutes the surface sheet 5, it is preferred to cause the adhesive infiltrated into the nonwoven cloth to ooze out to both faces of the nonwoven cloth so as to turn the nonwoven cloth into a state that the surface thereof is coated with this oozing adhesive, that is, a state that the adhesive is made into a layer form and is integrally laminated on both faces of the nonwoven cloth. From such a viewpoint, it is preferred to infiltrate the adhesive into the nonwoven cloth which constitutes the surface sheet 5 by the above-mentioned method (3) or (4).

As illustrated in FIGS. 17 and 18, the foam sheet A for a car interior member is usually used as a car interior member by integrally laminating a skin material 7 arranged toward the inside of a car, through an adhesive layer (not illustrated), on the face of the sheet A where the pore portions 2 are formed, integrally laminating an abnormal sound preventing layer 8 on the opposite face of the sheet A, and further molding the resultant into a desired shape by thermal molding.

In the case that the skin material 7 is integrally laminated on the foam sheet A for a car interior member without interposing the surface sheet 5 therebetween, it is preferred that openings of the pore portions 2 in the foam sheet A for a car interior member are not blocked with the adhesive layer for integrally laminating the skin material 7 on the foam sheet A for a car interior member in order for the adhesive layer not to hinder the vibration energy of sounds from advancing the open cell layer 11 or 1A of the foam sheet 1.

Accordingly, the following method is given as the method for integrally laminating the skin material 7 on one face of the foam sheet A for a car interior member without interposing the surface sheet 5 therebetween: for example, (1) a method of spraying the adhesive in a powder form on one face of the foam sheet A for a car interior member not to block openings of pore portions 2 therewith, so as to laminate the skin material 7 onto the face of the foam sheet A for a car interior member, and then integrally pressing the foam sheet A for a car interior member and the skin material 7 while heating the foam sheet A for a car interior member to the melting point of the adhesive or higher; (2) a method of spraying the adhesive in a powdery form onto the face of the skin material 7 opposite to the foam sheet A for a car interior member, pressing the sheet and the adhesive from both outer sides thereof while heating the sheet material 7 at the melting point of the adhesive or higher, so as to fix the adhesive onto the surface of the skin material 7, laminating this skin material 7 onto one face of the foam sheet A for a car interior member in the state that the face of this skin material 7 on which the adhesive is fixed is directed toward the foam sheet A for a car interior member, and heating the foam sheet A for a car interior member until the adhesive is melted, thereby integrally pressing the foam sheet A for a car interior member and the skin material 7; (3) a method of applying the adhesive onto one face of the foam sheet A for a car interior member not to block openings of the pore portions 2 therewith, and integrating the foam sheet A for a car interior member with the skin material 7 through this adhesive; (4) a method of applying the adhesive on the whole of one face of the unprocessed, modified polyphenylene ether-based resin foam sheet, forming the pore portions 2 in the above-mentioned manner to produce the foam sheet A for a car interior member, and integrally laminating the skin material 7 on one surface of this foam sheet A for a car interior member through the above-mentioned adhesive; or (5) a method of laminating the skin material 7 on one face of the foam sheet A for a car interior member through a nonwoven cloth or web having permeability and made of an adhesive, heating the foam sheet A for a car interior member to a temperature at which the adhesive is melted, and then integrally pressing the foam sheet A for a car interior member and the skin material 7.

When the skin material 7 is integrally laminated on the foam sheet A for a car interior member in the state that the surface sheet 5 is interposed therebetween, an adhesive may be used or the integral lamination may be performed by thermal fusion force between the skin material 7 and the surface sheet 5 of the foam sheet A for a car interior member. Alternatively, the skin adhesive layer 62 of the surface sheet 5 may be used. In any one of the methods, it is preferred to make an adjustment in such a manner that the pore portions 2 in the modified polyphenylene ether-based resin foam sheet 1 have permeability to the outside.

The skin material 7 may be an unwoven cloth, a woven cloth, a knitting cloth or the like, and preferably has permeability. A flame retardant may be incorporated into the skin material 7 in order to give flame resistance thereto.

The fiber which constitutes the skin material 7 may be a synthetic fiber made of a polyester such as polyethylene terephthalate, polyamide, or polyacrylonitrile. The polyester fiber is preferred. Polyethylene terephthalate fiber is more preferred since the heat resistance is good. The fibers which constitute the skin material 7 may be used alone or in combination.

The above-mentioned adhesive is not particularly limited as long as the adhesive makes it possible to integrally bond the skin material 7 and the foam sheet A for a car interior member to each other. Examples thereof include thermoplastic adhesive, hot melt adhesive, rubber-based adhesive, thermosetting adhesive, monomer-reactive adhesive, inorganic adhesive, and natural material adhesive. The hot melt adhesive is preferred since the adhesive makes it possible to bond them easily to each other.

Examples of the hot melt adhesive include adhesives comprising, as a component thereof, a resin such as polyolefin, modified polyolefin, polyurethane, ethylene-vinyl acetate copolymer, polyamide, polyester, thermoplastic elastomer, styrene-butadiene copolymer, or styrene-isoprene copolymer. These may be used alone or in combination thereof.

The abnormal sound preventing layer 8 is integrally laminated on the other face of the foam sheet A for a car interior member, that is, the face thereof where the pore portions 2 are not formed (perforated). This abnormal sound preventing layer 8 is a layer for decreasing frictional sounds generated when the foam sheet A for a car interior member is slid on a steel plate which constitutes the body of a car. A polyolefin resin film or a nonwoven cloth is preferably used. The nonwoven cloth is more preferably used.

Examples of the polyolefin resin film include a polyethylene film, a polypropylene film, and other polyolefin-based resin films. A non-drawn polypropylene film is preferred since it is excellent in heat resistance and is capable of decreasing frictional sounds stably over a long period in spite of a change in surrounding temperature. Usually, as the polyolefin-based resin film, a film having a thickness of 10 to 100 µm or 25 to 35 µm is preferably used.

The fiber which constitutes the nonwoven cloth used in the abnormal sound preventing layer 8 is not particularly limited, and examples thereof include synthetic resin fibers such as polyester fiber, polyethylene fiber, polypropylene fiber, polyamide fiber, and polyacrylonitrile fiber.

Finally, in each of the figures, boundary lines are drawn as the interfaces between the open cell layer 11 and the closed cell layers 12 and between each of the closed cell layers 12 and the corresponding non-foamed layer (skin layer) 13 in the perforated, modified polyphenylene ether-based resin foam sheet 1 for convenience' sake, in order to make outstanding easy. However, definite boundaries are not present between the open cell layer 11 and the closed cell layers 12 and between each of the closed cell layers 12 and the corresponding non-foamed layer (skin layer) 13 in the perforated, modified polyphenylene ether-based resin foam sheet 1 according to the invention.

Next, the skin material 7 is integrally laminated on one face of the foam sheet A for a car interior member and further the abnormal sound preventing layer 8 is integrally laminated on the other face thereof, and then the resultant is thermally molded into a desired shape, so as to be made into a car interior member, as described above.

As the method for molding the foam sheet A for a car interior member thermally, a method that has been widely used hitherto is used. For example, it is advisable to: heat the foam sheet A for a car interior member to cause the two-face temperature T1 (° C.) thereof to satisfy preferably the following expression 4, more preferably the following expression 5, and still more preferably the following expression 6, thereby subjecting the foam sheet A to secondary foaming; and subsequently mold thermally this foam sheet A for a car interior member, subjected to the secondary foaming, by use of a widely-used molding method such as vacuum forming or pressure forming.

(Glass transition temperature $Tg$ of modified polyphenylene ether-based resin constituting foam sheet 1-25° C.)$\leq T_1 \leq$(Glass transition temperature $Tg$ of modified polyphenylene ether-based resin constituting foam sheet 1+15° C.)      Expression 4

(Glass transition temperature $Tg$ of modified polyphenylene ether-based resin constituting foam sheet 1-20° C.)$\leq T_1 \leq$(Glass transition temperature $Tg$ of modified polyphenylene ether-based resin constituting foam sheet 1+10° C.)      Expression 5

(Glass transition temperature $Tg$ of modified polyphenylene ether-based resin constituting foam sheet 1-20° C.)$\leq T_1 \leq$(Glass transition temperature Tg of modified polyphenylene ether-based resin constituting foam sheet 1+5° C.)      Expression 6

The reason why the heating temperature for the foam sheet A for a car interior member is adjusted to be within the above-mentioned range(s) is as follows: if the heating temperature is low, residual strain may be generated at the time of molding the foam sheet A for a car interior member thermally, so that the dimensional change ratio may become large; and if the heating temperature is high, excessive heat is applied to the foam sheet A for a car interior member at that time, so that the foam sheet A may be shrunk, thereby lowering the mechanical strength of the foam sheet A for a car interior member or generating defect in the shape thereof.

Examples of the vacuum forming or pressure forming include plug forming, free drawing forming, plug-and-ridge forming, matched-forming, straight forming, drape forming, reverse draw forming, air slip forming, plug assist forming, and plug assist reverse draw forming. In the forming methods, it is preferred to use a mold the temperature of which can be adjusted.

The clearance of the mold preferably satisfies the following expression 7, and more preferably satisfies the following expression 8, wherein the initial thickness of the foam sheet A for a car interior member, subjected to the secondary foaming, is represented by T.

0.7$T \leq$Clearance of mold$\leq 0.98T$      Expression 7

0.8$T \leq$Clearance of mold$\leq 0.95T$      Expression 8

This is based on the following reasons: if the clearance of the mold is narrow, the ratio of the thickness of the open cell layer 11 to the total thickness of the foam sheet A for a car interior member may lower so as to make the sound absorbency lower; and if the clearance is wide, a car interior member having a precise shape may not be obtained.

Effects of the Invention

The foam sheet for a car interior member according to the present invention is a foam sheet wherein pore portions are formed in a modified polyphenylene ether-based resin foam sheet, which is formed as described above, or in a product formed as described above, in which modified polyphenylene ether resin sheets are integrally laminated on both faces of this modified polyphenylene ether-based resin foam sheet, in such a manner that the pore portions are open to the surface of the sheet or product; therefore, the vibration energy of sounds is smoothly induced through the pore portions into open cells in the perforated, modified polyphenylene ether-based resin foam sheet, so as to vibrate cell walls of the open cells, thereby converting the vibration energy to thermal energy. Thus, the foam sheet exhibits excellent sound absorbency.

The modified polyphenylene ether-based resin foam sheet of the foam sheet for a car interior member has an open cell ratio of 50% or more; therefore, the vibration energy of sounds advancing into the modified polyphenylene ether-based resin foam sheet can be rapidly dispersed into the modified polyphenylene ether-based resin foam sheet so as to be efficiently converted to thermal energy. Thus, the foam sheet exhibits excellent sound absorbency.

In the case that the surface sheet is integrally laminated on one of the foam sheet for a car interior member, the foam sheet for a car interior member is excellent in heat resistance, mechanical strength and dimensional stability. Even in the case that the skin material is integrally laminated on the foam sheet for a car interior member, the openings of the pore portions are hidden with the surface sheet. Therefore, even if a soft skin material is used, creases resulting from the pore portions are not generated and the skin material can be integrally laminated on the foam sheet for a car interior member in a good-looking state. About the foam sheet for a car interior member, the surface sheet is laminated on one face thereof; therefore, the foam sheet is excellent in heat resistance and dimensional stability at high temperature.

In the case that the foamed layer of the modified polyphenylene ether-based resin foam sheet has an open cell layer made mainly of open cells and its pore portions reach the open cell layer, the vibration energy of sounds is smoothly induced through the pore portions into the open cell layer, so as to vibrate cell walls of the open cells in the open cell layer, thereby converting the vibration energy to thermal energy. As a result, the foam sheet exhibits excellent sound absorbency.

In the case that the foamed layer of the modified polyphenylene ether-based resin foam sheet is made only of an open cell layer made mainly of open cells, the vibration energy of sounds is diffused through the pore portions into the whole of the modified polyphenylene ether-based resin foam sheet, thereby converting the vibration energy to thermal energy. As a result, the foam sheet exhibits excellent sound absorbency.

In the case that the foamed layer of the modified polyphenylene ether-based resin foam sheet is made of closed cell layers made mainly of closed cells on both faces of an open cell layer made mainly of open cells and its pore portions reach the open cell layer, the vibration energy of sounds is smoothly induced through the pore portions into the open cell layer of the modified polyphenylene ether-based resin foam sheet, so as to convert the vibration energy to thermal energy. As a result, the foam sheet exhibits excellent sound absorbency. Furthermore, the mechanical strength of the foam sheet for a car interior member is excellent since the closed cell layer is present in the foamed layer of the foam sheet. Accordingly, a car interior member obtained by molding the foam sheet for a car interior member thermally substantially keeps the thickness exhibiting before the thermal molding. Thus, the car interior member is excellent in thickness precision.

In the case that the modified polyphenylene ether-based resin foam sheet has an open cell ratio of 60 to 90% in the foam sheet for a car interior member, the vibration energy of sounds can be efficiently converted to thermal energy by effectively vibrating cell walls of open cells in the open cell layer of the foam sheet more. As a result, the sound absorbency of the foam sheet for a car interior member can be made excellent.

In the case that the thickness of the closed cell layer is 1 to 25% of that of the modified polyphenylene ether-based resin foam sheet, the foam sheet for a car interior member has excellent sound absorbency and air-blocking performance, thereby not only absorbing sounds from the pore-portion formation face side of the foam sheet but also blocking effectively sounds from the side opposite to the pore-portion formation face of the foam sheet.

In the case that the total opening area ratio of the pore portions to the surface of the foam sheet is from 2 to 50% in the foam sheet for a car interior member, excellent sound absorbency can be given to the foam sheet for a car interior member while the foam sheet keeps excellent mechanical strength.

In the case that the modified polyphenylene ether-based resin foam sheet is integrated with the surface sheet through an adhesive layer in the foam sheet for a car interior member and the adhesive which constitutes this adhesive layer is infiltrated into the whole of the surface sheet, the fibers which constitute the surface sheet can be more firmly bonded to each other through the adhesive so that the mechanical strength of the surface sheet can be improved. As a result, the foam sheet for a car interior member becomes a foam sheet having a lower linear expansion coefficient and an excellent mechanical strength.

EXPLANATION OF SYMBOLS

Figure 1:
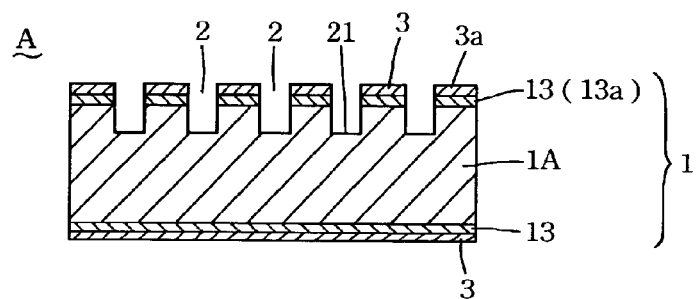
FIG. 1 is a schematic vertical end view illustrating a foam sheet for a car interior member according to the present invention.
Figure 2:
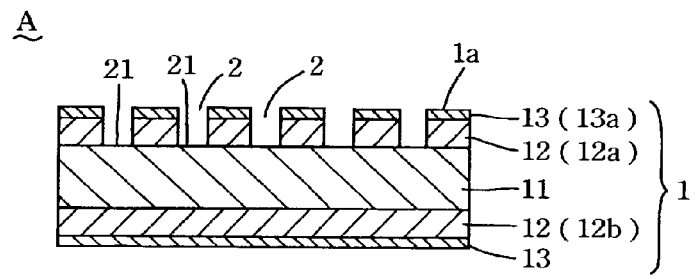
FIG. 2 is a schematic vertical end view illustrating a different example of the foam sheet for a car interior member according to the present invention.
Figure 3:
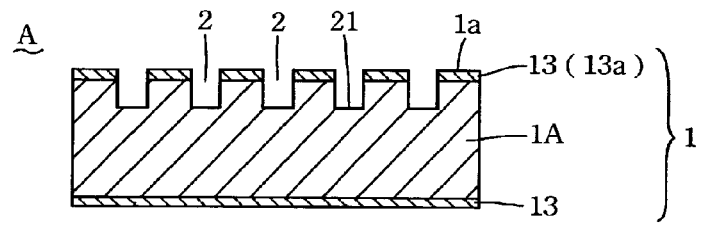
FIG. 3 is a schematic vertical end view illustrating a different example of the foam sheet for a car interior member according to the present invention.
Figure 4:
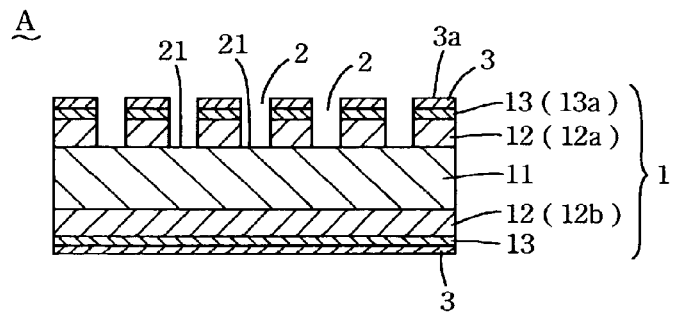
FIG. 4 is a schematic vertical end view illustrating a different example of the foam sheet for a car interior member according to the present invention.
Figure 5:
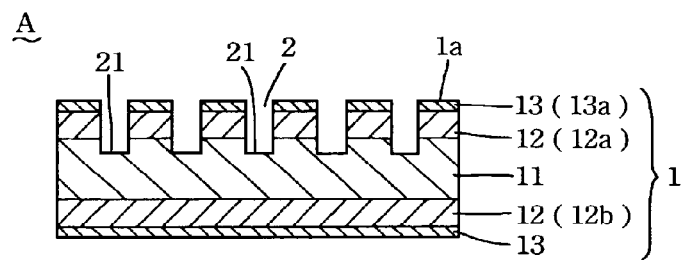
FIG. 5 is a schematic vertical end view illustrating a different example of the foam sheet for a car interior member according to the present invention.
Figure 6:
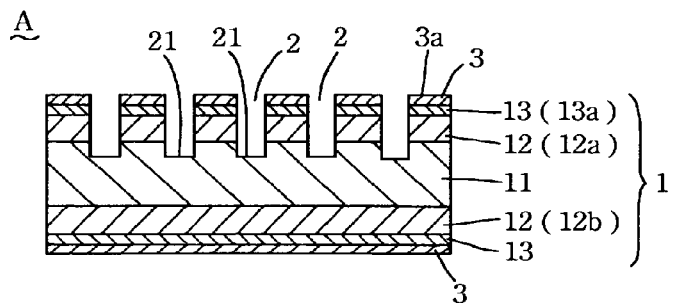
FIG. 6 is a schematic vertical end view illustrating a different example of the foam sheet for a car interior member according to the present invention.
Figure 7:
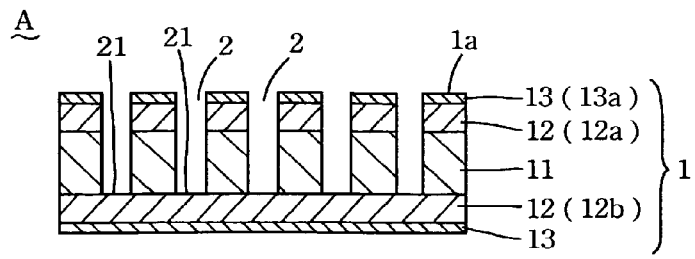
FIG. 7 is a schematic vertical end view illustrating a different example of the foam sheet for a car interior member according to the present invention.
Figure 8:
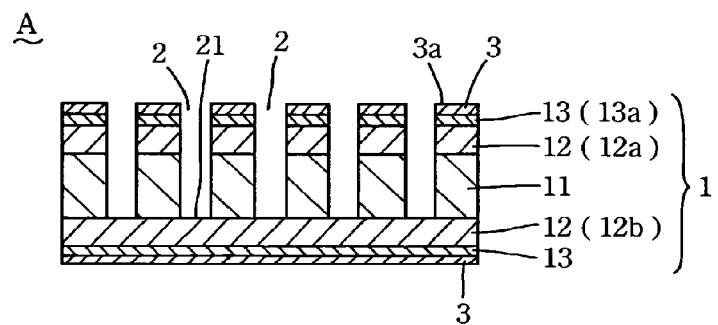
FIG. 8 is a schematic vertical end view illustrating a different example of the foam sheet for a car interior member according to the present invention.

1 Modified polyphenylene ether resin foam sheet
11, 1A Open cell layer
12 Closed cell layer
13 Non-foamed layer (skin layer)
2 Pore portion
2 Modified polyphenylene ether resin
5 Surface sheet
6 Adhesive layer
61 Adhesive
62 Skin adhesive layer
7 Skin material
8 Abnormal sound preventing material
A Foam sheet for car interior member
B Molded product

BEST MODE FOR CARRYING OUT THE INVENTION

EXAMPLE 1

The following were supplied to a first extruder: a modified polyphenylene ether-based resin (polyphenylene ether component: 35% by weight, polystyrene-based resin component: 65% by weight, glass transition temperature: 132° C.) obtained by mixing 50 parts by weight of a mixture of polyphenylene ether and polystyrene-based resin (trade name: "NORYL EFN4230", manufactured by GE Plastics Co., polyphenylene ether: 70% by weight, polystyrene-based resin: 30% by weight) and 50 parts by weight of a polystyrene (trade name: "HRM-26", manufactured by Toyo Styrene Co., Ltd.); and 0.65 part by weight of talc. The mixture was melted and kneaded, and further 3.9 parts by weight of a volatile foaming agent composed of 35% by weight of isobutane and 65% by weight of n-butane were put into the first extruder under pressure. The resultant was melted and kneaded at 300° C. Thereafter, the melted resin was continuously supplied to a second extruder connected to the tip of the first extruder, so as to adjust the resin temperature into 206° C. The melted resin was extruded and foamed from a circular die (temperature: 155° C.) attached to the tip of the second extruder into a cylindrical shape. This cylindrical foamed product was continuously cut in the extruding direction from its outer face to its inner face, and developed to yield an unprocessed, modified polyphenylene ether-based resin foam sheet. In the foamed layer of this unprocessed, modified polyphenylene ether-based resin foam sheet, a closed cell layer 12a made mainly of closed cells was formed on one face of an open cell layer 11 made mainly of open cells, and a closed cell layer 12b made mainly of closed cells was formed on the other face of the open cell layer 11. Non-foamed layers (skin layers) 13 and 13 were formed on the entire surfaces of the closed cell layers 12a and 12b.

Next, a flat plate having a surface wherein a large number of pins were planted was prepared. The pins of this flat plate were stuck into the unprocessed, modified polyphenylene ether-based resin foam sheet from the closed cell layer 12a side thereof. A large number of pore portions 2 each having a planar, completely-round opening end were formed in only a face of the modified polyphenylene ether-based resin foam sheet in the state that the pore portions 2 were extended from the surface 1a of the foam sheet to the inside of the open cell layer 11, that is, a great number of pore portions 2 each having a planar, completely-round opening end were formed in the state that the pore portions 2 were open to the surface 1a of the foam sheet and their bottoms 21 were positioned inside the open cell layer 11. In this way, a foam sheet A for a car interior member was yielded.

In the perforated, modified polyphenylene ether-based resin foam sheet 1 constituting the resultant foam sheet A for a car interior member, the thickness of the open cell layer 11 was 3.6 mm, the thickness of the closed cell layer 12a was 0.6 mm, the thickness of the closed cell layer 12b was 1.0 mm, and the weight per unit area was 250 g/m$^2$.

About the perforated, modified polyphenylene ether-based resin foam sheet 1, the density thereof was 0.048 g/cm$^3$, the open cell ratio in the whole thereof was 61.3%, the ratio of the open cells contained in the open cell layer 11 was 93.0%, the ratio of the closed cells contained in the closed cell layers 12 was 85%, and the average cell diameter was 0.54 mm.

Figure 9:
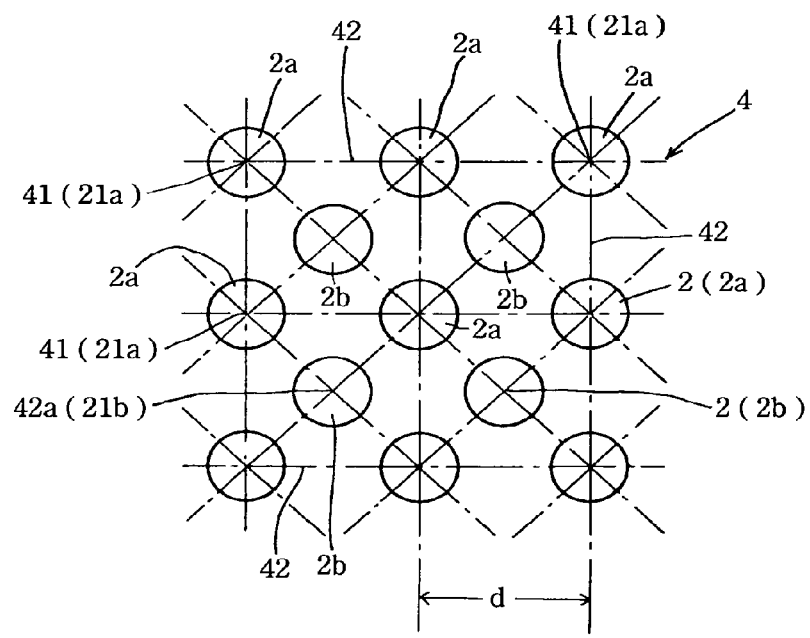
FIG. 9 is a plan view illustrating an example of a situation that pore portions are formed.
Figure 10:
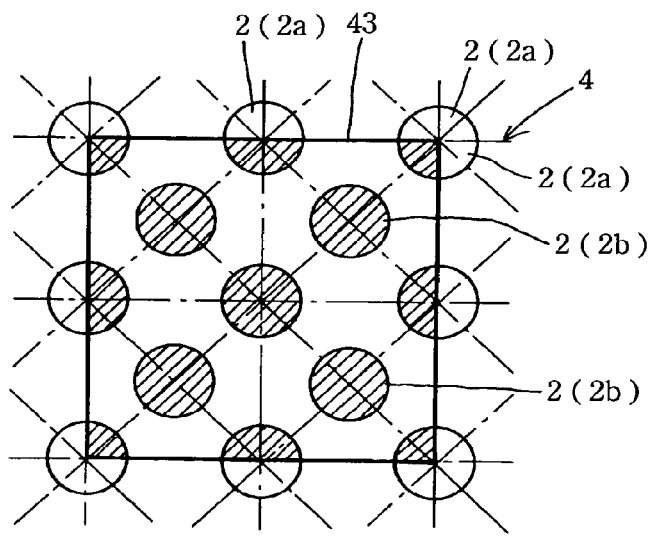
FIG. 10 is a plan view illustrating an example of a situation that pore portions are formed.
Figure 11:
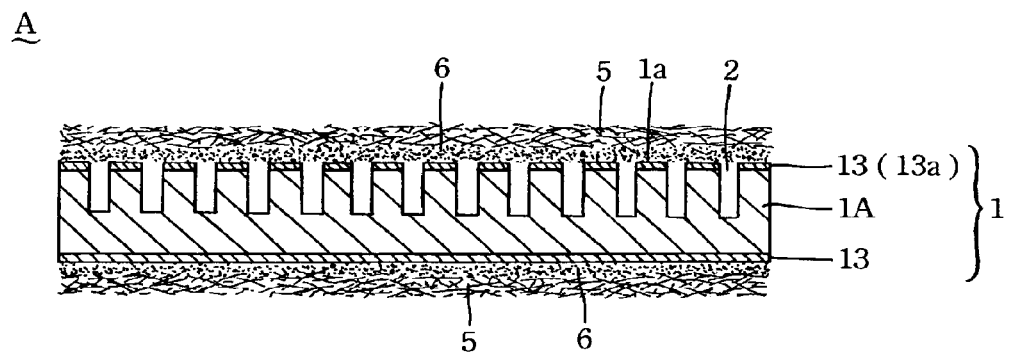
FIG. 11 is a schematic vertical end view illustrating a foam sheet for a car interior member according to the present invention.
Figure 12:
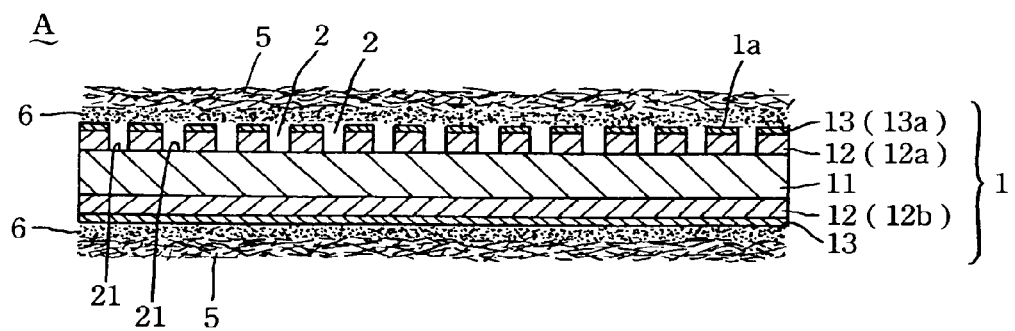
FIG. 12 is a schematic vertical end view illustrating a different example of the foam sheet for a car interior member according to the present invention.
Figure 13:
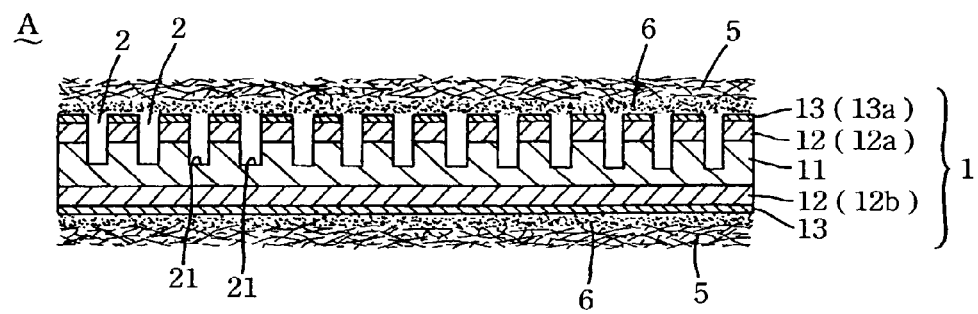
FIG. 13 is a schematic vertical end view illustrating a different example of the foam sheet for a car interior member according to the present invention.
Figure 14:
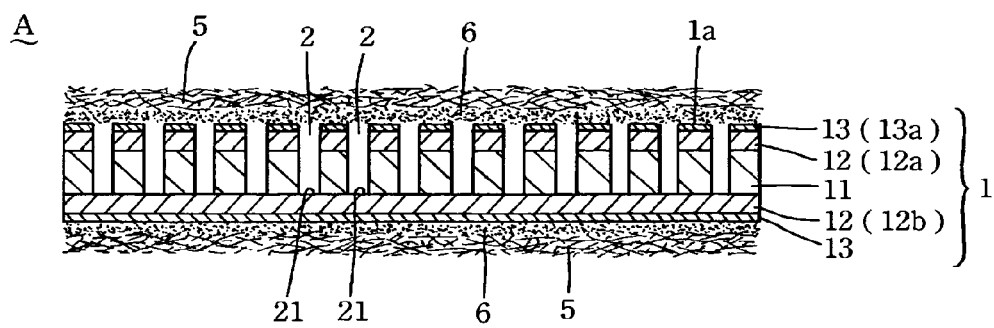
FIG. 14 is a schematic vertical end view illustrating a different example of the foam sheet for a car interior member according to the present invention.
Figure 15:
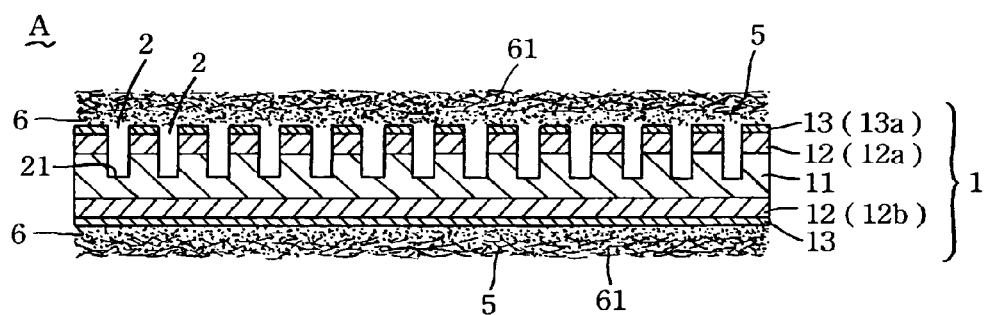
FIG. 15 is a schematic vertical end view illustrating a different example of the foam sheet for a car interior member according to the present invention.
Figure 16:
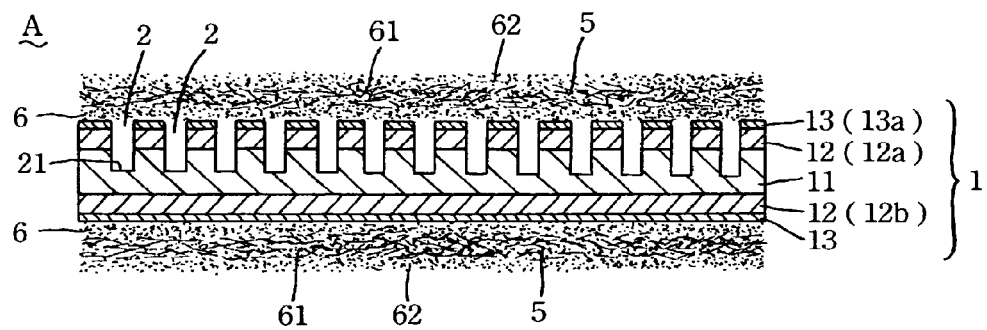
FIG. 16 is a schematic vertical end view illustrating a different example of the foam sheet for a car interior member according to the present invention.
Figure 17:
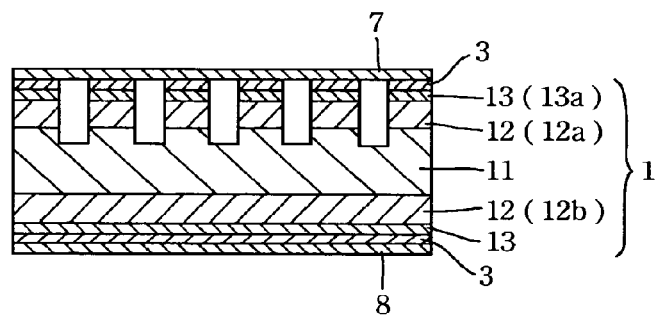
FIG. 17 is a schematic vertical end view illustrating a state that a skin material and an abnormal sound preventing material are integrally laminated on both faces of a foam sheet for a car interior member according to the present invention.
Figure 18:
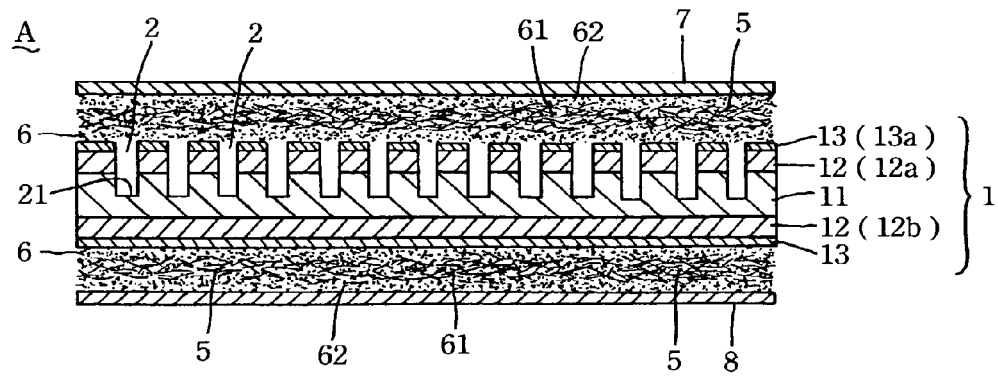
FIG. 18 is a schematic vertical end view illustrating a state that a skin material and an abnormal sound preventing material are integrally laminated on both faces of a foam sheet for a car interior member according to the present invention.

The pore portions 2 in the perforated, modified polyphenylene ether-based resin foam sheet 1 were evenly formed into a staggered shape, as illustrated in FIG. 9. The opening end area of each of the pore portions 2 was 3.14 mm$^2$, the depth thereof was 3.7 mm, the total opening area ratio of the pore portions 2 to the surface of the foam sheet A for a car interior member was 9.8%, and the length d of the square frame 42 of the imaginary lattice 4 was 8 mm.

EXAMPLE 2

The following mixed resin was supplied to each of two extruders: a mixed resin obtained by mixing a modified polyphenylene ether-based resin (glass transition temperature Tg: 116° C.) composed of a mixture of polyphenylene ether and polystyrene-based resin (trade name: "NORYL EFN4230", manufactured by GE Plastics Co., polyphenylene ether: 70% by weight, polystyrene-based resin: 30% by weight), a polystyrene (trade name: "HRM-26", manufactured by Toyo Styrene Co., Ltd.) and a high-impact polystyrene (trade name: "E641N", manufactured by Toyo Styrene Co., Ltd.) with a carbon black master batch as a coloring agent (trade name: "PS-M SSC 98H822A", manufactured by Dainichiseika Color & Chemicals Mfg. Co., Ltd.; carbon black: 40% by weight) while adjusting the amount of the polyphenylene ether component, that of the styrene-based resin components, that of the rubber component, and that of carbon black to 20% by weight, 77.6% by weight, 2% by weight and 0.4% by weight, respectively.

A melted, modified polyphenylene ether-based resin sheet, immediately after the above-mentioned mixed resin, was extruded from one of the two extruders, was laminated on one face of an unprocessed, modified polyphenylene ether-based resin foam sheet which was produced and developed in the same way as in Example 1 and was in a state immediately after the development, and then they were thermally melted and integrated with each other. Furthermore, a melted, modified polyphenylene ether-based resin sheet, immediately after the above-mentioned mixed resin was extruded from the other extruder, was laminated on the other face of the above-mentioned unprocessed, modified polyphenylene ether-based resin foam sheet. They were thermally melted and integrated with each other. In this way, modified polyphenylene ether-based resin sheets 3 and 3 colored, over the whole thereof in the thickness direction, into black with carbon black and having a thickness of 95 μm were directly integrally laminated on both faces of the unprocessed, modified polyphenylene ether-based resin foam sheet by the thermal melting.

Thereafter, the opening end area of the pore portions 2 was adjusted into 2.54 mm$^2$. In the same way as in Example 1 except these operations, there was yielded a foam sheet A for a car interior member wherein a large number of pore portions 2 were formed in only a single face of the unprocessed, modified polyphenylene ether-based resin foam sheet having both faces on which the modified polyphenylene ether-based resin sheets were integrally laminated, in the state that the pore portions 2 were open to the surface of one of the modified polyphenylene ether-based resin sheets and their bottoms 21 were positioned inside the open cell layer 11. The opening ends of the pore portions 2 were each in a planar, completely-round form.

About the perforated, modified polyphenylene ether-based resin foam sheet 1 of the resultant foam sheet A for a car interior member, the thickness thereof was 5.1 mm, the weight per unit area was 450 g/m$^2$, the thickness of the open cell layer 11 was 3.5 mm, the thickness of the closed cell layer 12a was 0.6 mm, the thickness of the different closed cell layer 12b was 1.0 mm, the density was 0.088 g/cm$^3$, the open cell ratio was 73.3%, the ratio of the open cells contained in the open cell layer 11 was 94.6%, the ratio of the closed cells contained in the closed cell layers 12 was 85%, and the average cell diameter was 0.54 mm.

The pore portions 2 in the modified polyphenylene ether-based resin foam sheet 1 were evenly formed into a staggered shape, as illustrated in FIG. 9. The opening end area of each of the pore portions 2 was 2.54 mm$^2$, the depth thereof was 3.7 mm, the total opening area ratio of the pore portions 2 to the surface of the foam sheet A for a car interior member was 7.9%, and the length d of the square frame 42 of the imaginary lattice 4 was 8 mm.

EXAMPLE 3

The following mixed resin was supplied to each of two extruders: a mixed resin obtained by mixing a modified polyphenylene ether-based resin (glass transition temperature Tg: 113° C.) composed of a mixture of polyphenylene ether and polystyrene-based resin (trade name: "NORYL EFN4230", manufactured by GE Plastics Co., polyphenylene ether: 70% by weight, polystyrene-based resin: 30% by weight), a polystyrene (trade name: "HRM-26", manufactured by Toyo Styrene Co., Ltd.), and a high-impact polystyrene (trade name: "E641N", manufactured by Toyo Styrene Co., Ltd.) with a carbon black master batch as a coloring agent (trade name: "PS-M SSC 98H822A", manufactured by Dainichiseika Color & Chemicals Mfg. Co., Ltd., carbon black: 40% by weight) while adjusting the amount of the polyphenylene ether component, that of the styrene-based resin components, that of the rubber component, and that of carbon black to 16.8% by weight, 81.2% by weight, 2.6% by weight and 0.4% by weight, respectively.

Separately, in the same way as in Example 1 except that the amount of the volatile foaming agent was changed from 3.9 parts by weight to 3.5 parts by weight, the resin temperature in the second extruder was changed from 206° C. to 203° C. and the temperature of the circular die was changed from 155° C. to 180° C., the melted resin was extruded and foamed from the circular die attached to the tip of the second extruder into a cylindrical shape. This cylindrical foamed product was continuously cut in the extruding direction from its outer face to its inner face, and developed. A melted, modified polyphenylene ether-based resin sheet, immediately after the above-mentioned mixed resin was extruded from one of the two extruders, was laminated on one face of the unprocessed, modified polyphenylene ether-based resin foam sheet immediately after the development, and then they were thermally melted and integrated with each other. Furthermore, a melted, modified polyphenylene ether-based resin sheet, immediately after the resin was extruded from the other extruder, was laminated on the other face of the above-mentioned unprocessed, modified polyphenylene ether-based resin foam sheet. They were thermally melted and integrated with each other. In this way, modified polyphenylene ether-based resin sheets 3 and 3 colored, over the whole thereof in the thickness direction, into black with carbon black and having a thickness of 95 μm were integrally laminated directly on both faces of the unprocessed, modified polyphenylene ether-based resin foam sheet by the thermal melting.

Thereafter, the opening end area of the pore portions 2 and the length d of the square frame 42 of the imaginary frame lattice 4 were adjusted into 0.50 mm² and 4 mm, respectively. In the same way as in Example 1 except these operations, there was yielded a foam sheet A for a car interior member wherein a large number of pore portions 2 were formed in only a single face of the unprocessed, modified polyphenylene ether-based resin foam sheet having both faces on which the modified polyphenylene ether-based resin sheets were integrally laminated, in the state that the pore portions 2 were open to the surface of one of the modified polyphenylene ether-based resin sheets and reached the inside of the open cell layer of the modified polyphenylene ether-based resin foam sheet.

The foamed layer of the perforated, modified polyphenylene ether-based resin foam sheet 1 of the resultant foam sheet A for a car interior member was made only of the open cell layer 1A made mainly of open cells, and non-foamed layers 13 having a thickness of 0.1 mm were formed on both faces of this open cell layer 1A. About the perforated, modified polyphenylene ether-based resin foam sheet 1, the thickness thereof was 5.3 mm, the weight per unit area was 500 g/m², and the density was 0.094 g/cm³. The open cell ratio in the whole of the foam sheet was 79.6%, the open cell ratio in the open cell layer 1A was 92.2%, and the average cell diameter was 0.49 mm.

The pore portions 2 in the perforated, modified polyphenylene ether-based resin foam sheet were evenly formed into a staggered shape, as illustrated in FIG. 9. The opening end area of each of the pore portions 2 was 0.50 mm², the depth thereof was 4.0 mm, the total opening area ratio of the pore portions 2 to the surface of the foam sheet A for a car interior member was 6.3%, and the length d of the square frame 42 of the imaginary lattice 4 was 4 mm.

EXAMPLE 4

A foam sheet A for a car interior member was yielded in the same way as in Example 3 except that the planar, completely-round pore portions 2 in the perforated, modified polyphenylene ether-based resin foam sheet 1 were evenly formed into a lattice shape and the length d of the square frame 42 of the imaginary lattice 4 was adjusted into 5.3 mm.

About the perforated, modified polyphenylene ether-based resin foam sheet 1, the thickness thereof was 5.3 mm, the weight per unit area was 500 g/m², the density was 0.094 g/cm³, the open cell ratio in the whole of the foam sheet was 79.2%, the open cell ratio in the open cell layer 1A was 92.0%, and the average cell diameter was 0.49 mm.

The opening end area of each of the pore portions 2 was 0.50 mm², the depth thereof was 4.0 mm, the total opening area ratio of the pore portions 2 to the surface of the foam sheet A for a car interior member was 3.6%, and the length d of the square frame 42 of the imaginary lattice 4 was 5.3 mm.

EXAMPLE 5

A melted resin was extruded and foamed from the circular die attached to the tip of the second extruder into a cylindrical shape in the same way as in Example 1 except the following: as the modified polyphenylene ether-based resin, there was used a modified polyphenylene ether-based resin (polyphenylene ether component: 40% by weight, polystyrene-based resin component: 60% by weight, glass transition temperature: 137° C.) obtained by mixing 57.1 parts by weight of a mixture of polyphenylene ether and polystyrene-based resin (trade name: "NORYL EFN4230", manufactured by GE Plastics Co., polyphenylene ether: 70% by weight, polystyrene-based resin: 30% by weight) and 42.9 parts by weight of a polystyrene (trade name: "HRM-26", manufactured by Toyo Styrene Co., Ltd.); the amount of the volatile foaming agent was changed from 3.9 parts by weight to 3.5 parts by weight; the resin temperature in the second extruder was changed from 206° C. to 208° C.; and the temperature of the circular die was changed from 155° C. to 185° C. This cylindrical foamed product was continuously cut in the extruding direction from its outer face to its inner face, and developed. In the same way as in Example 3, modified polyphenylene ether-based resin sheets were thermally melted and integrated directly with both faces of the unprocessed, modified polyphenylene ether-based resin foam sheet immediately after the development. Furthermore, in the same way as in Example 3, pore portions were formed in the unprocessed, modified polyphenylene ether-based resin foam sheet. In this way, a foam sheet A for a car interior member was yielded.

The foamed layer of the perforated, modified polyphenylene ether-based resin foam sheet 1 of the resultant foam sheet A for a car interior member was made only of the open cell layer 1A made mainly of open cells, and non-foamed layers 13 having a thickness of 0.1 mm were formed on both faces of this open cell layer 1A. About the perforated, modified polyphenylene ether-based resin foam sheet 1, the thickness thereof was 5.4 mm, the weight per unit area was 500 g/m², and the density was 0.093 g/cm³. The open cell ratio in the whole of the foam sheet was 79.6%, the open cell ratio in the open cell layer 1A was 92.6%, and the average cell diameter was 0.55 mm.

The pore portions 2 in the perforated, modified polyphenylene ether-based resin foam sheet 1 were evenly formed into a staggered shape, as illustrated in FIG. 9. The opening end area of each of the pore portions 2 was 0.50 mm$^2$, the depth thereof was 4.0 mm, the total opening area ratio of the pore portions 2 to the surface of the foam sheet A for a car interior member was 6.3%, and the length d of the square frame 42 of the imaginary lattice 4 was 4 mm.

EXAMPLE 6

A foam sheet for a car interior member was yielded in the same way as in Example 5 except that the thickness of the modified polyphenylene ether-based resin sheets integrally laminated on both faces of the unprocessed, modified polyphenylene ether-based resin foam sheet was changed from 95 μm to 119 μm.

EXAMPLE 7

In the same way as in Example 1 except the following, a melted resin was extruded and foamed from the circular die attached to the tip of the second extruder into a cylindrical shape: as the modified polyphenylene ether-based resin, there was used a modified polyphenylene ether-based resin (polyphenylene ether component: 45% by weight, polystyrene-based resin component: 55% by weight, glass transition temperature: 142° C.) obtained by mixing 64.3 parts by weight of a mixture of polyphenylene ether and polystyrene-based resin (trade name: "NORYL EFN4230", manufactured by GE Plastics Co., polyphenylene ether: 70% by weight, polystyrene-based resin: 30% by weight) and 35.7 parts by weight of a polystyrene (trade name: "HRM-26", manufactured by Toyo Styrene Co., Ltd.); the amount of the volatile foaming agent was changed from 3.9 parts by weight to 3.5 parts by weight; the resin temperature in the second extruder was changed from 206° C. to 212° C.; and the temperature of the circular die was changed from 155° C. to 189° C. This cylindrical foamed product was continuously cut in the extruding direction from its outer face to its inner face, and developed. In the same way as in Example 3, modified polyphenylene ether-based resin sheets were thermally melted and integrated directly with both faces of the unprocessed, modified polyphenylene ether-based resin foam sheet immediately after the development. Furthermore, in the same way as in Example 3, pore portions were formed in the unprocessed, modified polyphenylene ether-based resin foam sheet. In this way, a foam sheet A for a car interior member was yielded.

The foamed layer of the perforated, modified polyphenylene ether-based resin foam sheet 1 of the resultant foam sheet A for a car interior member was made only of the open cell layer 1A made mainly of open cells, and non-foamed layers 13 having a thickness of 0.1 mm were formed on both faces of this open cell layer 1A. About the perforated, modified polyphenylene ether-based resin foam sheet 1, the thickness thereof was 5.4 mm, the weight per unit area was 500 g/m$^2$, and the density was 0.093 g/cm$^3$. The open cell ratio in the whole of the foam sheet was 78.6%, the open cell ratio in the open cell layer 1A was 92.7%, and the average cell diameter was 0.49 mm.

The pore portions 2 in the perforated, modified polyphenylene ether-based resin foam sheet 1 were evenly formed into a staggered shape, as illustrated in FIG. 9. The opening end area of each of the pore portions 2 was 0.50 mm$^2$, the depth thereof was 4.0 mm, the total opening area ratio of the pore portions 2 to the surface of the foam sheet A for a car interior member was 6.3%, and the length d of the square frame 42 of the imaginary lattice 4 was 4 mm.

EXAMPLE 8

An ethylene-vinyl acetate copolymer-based hot melt adhesive (melting point: 97° C.) in a powdery form was evenly sprayed onto a single face of a surface material 7 (manufactured by Kureha Ltd., weight per unit area: 130 g/m$^2$) made of a nonwoven cloth made of polyethylene terephthalate fiber in an amount of 30 g/m$^2$.

Thereafter, the skin material 7 was heated to a temperature of the melting point or more of the hot melt adhesive, and further the skin material 7 was pressed from both outer faces at a pressure of 0.7 MPa to fixedly bond the hot melt adhesive onto the single face of the skin material 7 in the state that a part of the adhesive was infiltrated into the skin material 7.

The skin material 7 was stacked onto the pore portion 2 formation face of the foam sheet A for a car interior member obtained in Example 3 so as to direct the adhesive-bonded face of the material 7 toward the foam sheet A for a car interior member. Thereafter, the foam sheet A for a car interior member was heated to a temperature of the melting point or more of the hot melt adhesive, and the foam sheet A for a car interior member and the skin material 7 were pressed on each other from both outer sides thereof so that they were integrated with each other. An adjustment was made not to block the pore portions 2 in the foam sheet A for a car interior member with the hot melt adhesive.

EXAMPLE 9

An unprocessed, modified polyphenylene ether-based resin foam sheet 1 was yielded in the same way as in Example 1. In the foamed layer of this modified polyphenylene ether-based resin foam sheet 1, a closed cell layer 12a, 1.0 mm in thickness, made mainly of closed cells was formed on one face of an open cell layer 11, 3.6 mm in thickness, made mainly of open cells, and a closed cell layer 12b, 0.6 mm in thickness, made mainly of closed cells was formed on the other face of the open cell layer 11. The weight per unit area was 265 g/m$^2$. Non-foamed layers 13 and 13 were formed on the entire surfaces of the closed cell layers 12a and 12b.

About the unprocessed, modified polyphenylene ether-based resin foam sheet 1, the thickness thereof was 5.2 mm, the density thereof was 0.051 g/cm$^3$, the open cell ratio was 61.3%, the ratio of the open cells contained in the open cell layer 11 was 93%, the ratio of the closed cells contained in the closed cell layers 12 was 85%, and the average cell diameter was 0.54 mm.

Next, a flat plate having a surface wherein a large number of pins were planted was prepared. The pins of this flat plate were stuck into the unprocessed, modified polyphenylene ether-based resin foam sheet 1 from the closed cell layer 12a side thereof. A large number of pore portions 2 each having a planar, completely-round shape were formed in one face of the modified polyphenylene ether-based resin foam sheet 1 in the state that the pore portions 2 were extended from the surface 1a of the foam sheet 1 to the inside of the open cell layer 11, that is, a large number of pore portions 2 each having a planar, completely-round shape were formed in the state that the pore portions 2 were open to the surface 1a of the foam sheet 1 and their bottoms 21 were positioned inside the open cell layer 11. In this way, a foam sheet A for a car interior member was yielded.

In the perforated, modified polyphenylene ether-based resin foam sheet 1 constituting the resultant foam sheet A for a car interior member, the thickness of the open cell layer 11 was 3.6 mm, the thickness of the closed cell layer 12a was 1.0 mm, the thickness of the closed cell layer 12b was 0.6 mm, and the weight per unit area was 265 g/m$^2$.

About the perforated, modified polyphenylene ether-based resin foam sheet 1, the density thereof was 0.051 g/cm$^3$, the open cell ratio in the whole thereof was 62.5%, the ratio of the open cells contained in the open cell layer 11 was 94.0%, the ratio of the closed cells contained in the closed cell layers 12 was 84%, and the average cell diameter was 0.54 mm.

The pore portions 2 in the perforated, modified polyphenylene ether-based resin foam sheet 1 were evenly formed into a staggered shape, as illustrated in FIG. 9. The opening end area of each of the pore portions 2 was 2.27 mm$^2$, the depth thereof was 4.7 mm, the total opening area ratio of the pore portions 2 to the surface of the modified polyphenylene ether-based resin foam sheet 1 was 7.1%, and the length d of the square frame 32 of the imaginary lattice 3 was 8 mm.

Separately, as nonwoven cloths constituting surface sheets, two cloths were prepared, which were each made of sisal hemp fiber and core/sheath type synthetic resin fiber having a core portion made of polyethylene terephthalate and a sheath portion made of polyethylene, were each produced by a wet papermaking process, and each had a substantially constant thickness (sisal hemp fiber diameter: 150 to 250 μm, sisal hemp fiber length: 25 mm, melting point of polyethylene terephthalate constituting core portion in core/sheath type synthetic resin fiber: 250° C., melting point of polyethylene constituting sheath portion: 80° C., diameter of core/sheath type synthetic resin fiber: 2 deniers, length of core/sheath type synthetic resin fiber: 5 mm, sisal hemp fiber: core/sheath type synthetic resin fiber (ratio by weight)=40:60, weight per unit area: 85 g/m$^2$, thickness: 0.33 mm). The sisal hemp fibers were substantially evenly distributed in the nonwoven cloths.

One of the nonwoven cloths was laminated, as a surface sheet, on one face (pore-portion formation face 1a) of the foam sheet A for a car interior member through a net-like sheet (trade name: "DYNATEC LNS8050", manufactured by Kureha Ltd., weight per unit area: 50 g/m$^2$) made of a hot melt adhesive (polyamide-based adhesive), and further the other nonwoven cloth was laminated, as a surface sheet, on the other face of the foam sheet A for a car interior member through a film (trade name: "X-2200", manufactured by Kurabo Industries Ltd., weight per unit area: 24 g/m$^2$) made of a hot melt adhesive (polyolefin-based adhesive), so as to produce a nonwoven cloth laminated sheet.

Thereafter, the nonwoven cloth laminated sheet was supplied between opposite faces of upper and lower belts (temperature: 135 to 145° C.) made of polytetrafluoroethylene and made opposite to each other at a given interval in the vertical direction so as to melt the hot melt adhesives of the nonwoven cloth laminated sheet while the surface sheets were pressed against both faces of the foam sheet A for a car interior member, thereby integrally laminating the surface sheets on both faces of the foam sheet A for a car interior member. The total thickness of the foam sheet A for a car interior member was 5.9 mm, and the weight per unit area of the whole foam sheet A for a car interior member was 509 g/m$^2$.

EXAMPLE 10

As a skin material, a nonwoven cloth (weight per unit area: 180 g/m$^2$, and thickness: 1.0 mm) made of polyethylene terephthalate fiber was prepared. The skin material was laminated on the surface sheet integrally laminated on the pore-portion formation face 1a of the foam sheet A for a car interior member produced in the same way as in Example 9 through a net-like sheet (trade name: "DYNATEC LNS8050", manufactured by Kureha Ltd., weight per unit area: 50 g/m$^2$) made of a hot melt adhesive (polyamide-based adhesive).

Thereafter, the foam sheet A for a car interior member was supplied between opposite faces of upper and lower belts (temperature: 135 to 145° C.) made of polytetrafluoroethylene and made opposite to each other at a given interval in the vertical direction so as to melt the hot melt adhesives while the skin material was pressed against one face of the foam sheet A for a car interior member in the thickness direction thereof, thereby integrally laminating the skin material on the face of the foam sheet A for a car interior member. The thickness of the foam sheet A for a car interior member was 6.9 mm, and the weight per unit area thereof was 739 g/m$^2$. The pore portions 2 in the foam sheet A for a car interior member had a permeability to the outside.

EXAMPLE 11

An unprocessed, modified polyphenylene ether-based resin foam sheet was yielded in the same way as in Example 1 except that the amount of the volatile foaming agent was changed from 3.9 parts by weight to 3.5 parts by weight, the resin temperature in the second extruder was changed from 206° C. to 205° C. and the temperature of the circular die was changed from 155° C. to 180° C.

About the unprocessed, modified polyphenylene ether-based resin foam sheet, the thickness thereof was 5.0 mm, the density thereof was 0.060 g/cm$^3$, the open cell ratio was 81.4%, the average cell diameter was 0.57 mm, and the weight per unit area was 300 g/m$^2$.

The foamed layer of the unprocessed, modified polyphenylene ether-based resin foam sheet 1 was made only of the open cell layer 1A, 4.8 mm in thickness, made mainly of open cells, and non-foamed layers 13 and 13 having a thickness of 0.1 mm were formed on both faces of this open cell layer 1A. Pore portions 2 were formed in one face of the unprocessed, modified polyphenylene ether-based resin foam sheet 1 in the same way as in Example 9, so as to yield a foam sheet A for a car interior member.

About the perforated, modified polyphenylene ether-based resin foam sheet 1, the thickness thereof was 5.0 mm, the weight per unit area was 300 g/m$^2$, the density was 0.060 g/cm$^3$, the open cell ratio in the whole of the foam sheet was 82.5%, and the average cell diameter was 0.57 mm.

The pore portions 2 in the perforated, modified polyphenylene ether-based resin foam sheet 1 were evenly formed into a staggered shape, as illustrated in FIG. 9. The opening end area of each of the pore portions 2 was 0.64 mm$^2$, the depth thereof was 4.0 mm, the total opening area ratio of the pore portions 2 to the surface of the modified polyphenylene ether-based resin foam sheet 1 was 3.5%, and the length d of the square frame 32 of the imaginary lattice 3 was 6 mm.

Separately, kenaf fiber and core/sheath type synthetic resin fiber wherein its core portion and sheath portion were made of polyethylene terephthalate were supplied to a carding machine to produce a web. A styrene-butylene copolymer (SBR resin) was infiltrated into this web, and the resultant was dried to produce two nonwoven cloths, which would be surface sheets, (kenaf fiber diameter: 50 to 130 μm, kenaf fiber length: 76 mm, melting point of polyethylene terephthalate constituting core portion in core/sheath type synthetic resin fiber: 255° C., melting point of polyethylene terephthalate constituting sheath portion: 110° C., diameter of core/sheath type synthetic resin fiber: 2 deniers, length of core/sheath type synthetic resin fiber: 51 mm, kenaf fiber:core/sheath type synthetic resin fiber (ratio by weight)=80:20, weight per unit area: 78 g/m², thickness: 0.45 mm, styrene-butylene copolymer content: 8.3 g/m²).

Powder of an EVA-based hot melt adhesive (mixture of ethylene-vinyl acetate copolymer and linear low-density polyethylene, melting point: 100° C.) was evenly sprayed onto the whole of one face of each of the nonwoven cloths at a ratio of 35.5 parts by weight (27.7 g/m²) to 100 parts by weight of the nonwoven cloth.

Thereafter, the nonwoven cloth on which the EVA-based hot melt adhesive power was sprayed was heated to 120° C., and then this nonwoven cloth was supplied between a pair of cooling rolls so as to compress the nonwoven cloth in the thickness direction. In this way, the hot melt adhesive was infiltrated into the whole of the nonwoven cloth.

Next, the nonwoven cloth into which the hot melt adhesive was infiltrated was laminated, as a surface sheet, on each of both faces of the modified polyphenylene ether-based resin foam sheet 1 to produce a nonwoven cloth laminated sheet. Subsequently, the nonwoven cloth laminated sheet was supplied between opposite faces of upper and lower belts (temperature: 135 to 145° C.) made of polytetrafluoroethylene and made opposite to each other at a given interval in the vertical direction, so as to melt the hot melt adhesives inside the surface sheets of the nonwoven cloth laminated sheet while the surface sheets were pressed against both faces of the foam sheet A for a car interior member, thereby integrally laminating the surface sheets on both faces of the foam sheet. The total thickness of the foam sheet A for a car interior member was 5.9 mm, and the weight per unit area of the whole foam sheet A for a car interior member was 528 g/m².

COMPARATIVE EXAMPLE 1

An unprocessed, modified polyphenylene ether-based resin foam sheet 1 was yielded in the same way as in Example 1 except that the resin temperature in the second extruder was adjusted to 202° C. and the amount of the volatile foaming agent was set to 3.3 parts by weight. In the foamed layer of this unprocessed, modified polyphenylene ether-based resin foam sheet, a closed cell layer 12a made mainly of closed cells was formed on one face of an open cell layer 11 made mainly of open cells, and a closed cell layer 12b made mainly of closed cells was formed on the other face of the open cell layer 11. Non-foamed layers 13 and 13 were formed on the entire surfaces of the closed cell layers 12a and 12b. Next, pore portions 2 were formed in this unprocessed, modified polyphenylene ether-based resin foam sheet in the same way as in Example 1, so as to yield a foam sheet A for a car interior member.

In the perforated, modified polyphenylene ether-based resin foam sheet 1 constituting the resultant foam sheet A for a car interior member, the thickness of the open cell layer 11 was 1.8 mm, the thickness of the closed cell layer 12a was 1.0 mm, and the thickness of the closed cell layer 12b was 1.2 mm.

About the perforated, modified polyphenylene ether-based resin foam sheet 1, the thickness thereof was 4.0 mm, the weight per unit area was 210 g/m², the density was 0.053 g/cm³, the open cell ratio in the whole was 48.1%, the ratio of the open cells contained in the open cell layer 11 was 90.6%, the ratio of the closed cells contained in the closed cell layers 12 was 81%, and the average cell diameter was 0.49 mm.

COMPARATIVE EXAMPLE 2

An unprocessed, modified polyphenylene ether-based resin foam sheet 1 was yielded in the same way as in Example 1 except that the resin temperature in the second extruder was adjusted to 202° C., the amount of the volatile foaming agent was set to 3.3 parts by weight, and the temperature of the circular die was set to 157° C.

In the foamed layer of the resultant unprocessed, modified polyphenylene ether-based resin foam sheet 1, a closed cell layer 12a, 1.0 mm in thickness, made mainly of closed cells was formed on one face of an open cell layer 11, 1.8 mm in thickness, made mainly of open cells, and a closed cell layer 12b, 1.2 mm in thickness, made mainly of closed cells was formed on the other face of the open cell layer 11.

About the unprocessed, modified polyphenylene ether-based resin foam sheet 1, the thickness thereof was 4.0 mm, the weight per unit area was 210 g/m², the density was 0.053 g/cm³, the open cell ratio was 48.1%, the ratio of the open cells contained in the open cell layer 11 was 90.6%, the ratio of the closed cells contained in the closed cell layers 12 was 81%, and the average cell diameter was 0.49 mm.

Pore portions 2 was formed in one face of the unprocessed, modified polyphenylene ether-based resin foam sheet 1 in the same way as in Example 1, so as to yield a foam sheet A for a car interior member. The pore portions 2 in the modified polyphenylene ether-based resin foam sheet 1 were evenly formed into a staggered shape, as illustrated in FIG. 9. The opening end area of each of the pore portions 2 was 3.14 mm², the depth thereof was 3.7 mm, the total opening area ratio of the pore portions 2 to the surface of the modified polyphenylene ether-based resin foam sheet 1 was 9.8%, and the length d of the square frame 32 of the imaginary lattice 3 was 8 mm.

Next, a surface sheet was integrally laminated on each of both faces of the foam sheet A for a car interior member in the same way as in Example 11. About the foam sheet A for a car interior member, the total thickness thereof was 4.9 mm and the weight per unit area of the whole was 438 g/m².

The sound absorbency of the foam sheets for a car interior member yielded as described above and that of secondarily foamed, molded products obtained by secondarily foaming the foam sheets for a car interior member, and the moldability of the foam sheets for a car interior member were measured by the following methods. The results are shown in Tables 1 to 6, and FIGS. 20 to 23. The linear expansion coefficients of the foam sheets A for a car interior member of Examples 2 and 9 to 11 and Comparative Examples 2 were measured. The linear expansion coefficient of the foam sheet for a car interior member of Example 2 was $48.20 \times 10^6/°$ C.

(Sound Absorbency)

About the sound absorbency of the foam sheets A for a car interior member and the secondarily foamed, molded products obtained by secondarily foaming the foam sheets A for a car interior member, sound waves having frequencies of 500 to 6300 Hz were emitted into the foam sheets A for a car interior member and the secondarily foamed, molded products from the open sides of their pore portions 2, under a condition that no rear air layer was present, by a transfer function method according to the test of the ratio of perpendicularly emitted sound absorbency of ASTM E1050, so as to measure the ratios of the perpendicularly emitted sound absorbencies thereof. The sound absorbencies of the foam sheets A for a car interior member are shown in Tables 1 and 3 and FIGS. 20 and 22. The sound absorbencies of the secondarily foamed, molded products are shown in Tables 2 and 4 and FIGS. 21 and 23.

Each of the secondarily foamed, molded products was yielded by the following method. Specifically, each of the foam sheets A for a car interior member was heated until the surface thereof became a temperature shown in Table 5 or 6, so as to secondarily foam the sheet without restraint. When the surface temperature of the foam sheet A for a car interior member became the surface temperature shown in Table 5 or 6, the heating of the foam sheet A for a car interior member was finished. The thickness of the foam sheet A for a car interior member, subjected to secondary foaming, was measured. This method was repeated three times. The arithmetic average of the thicknesses of three test pieces of the foam sheet A for a car interior member, subjected to the secondary foaming, was defined as the post-secondary-foaming thickness.

Next, each of the foam sheets A for a car interior member was heated until the surface temperature thereof became a temperature shown in Table 5 or 6. Thereafter, this foam sheet A for a car interior member was arranged between a pair of planar molds the opposite faces of which were made smooth, and then the planar molds were closed to cool the foam sheet A for a car interior member and simultaneously compression-mold the sheet A in the thickness direction thereof until the thickness became 90% of the post-secondary-foaming thickness in the case that its foamed layer had the closed cell layers or until the thickness thereof became 95% of the post-secondary-foaming thickness in the case that its foamed layer was made only of the open cell layer. When the surface temperature of the foam sheet A for a car interior member became 50° C. lower than the glass transition temperature Tg of the modified polyphenylene ether-based resin constituting the foam sheet 1, the pair of planar molds were opened. In this way, a secondarily foamed, molded product was obtained. In the above-mentioned way, about the foam sheets A for a car interior member of Examples 8 and 10, the temperature of their face where the skin material 7 was not laminated was measured.

The total thickness of the secondarily foamed, molded product, the thickness of the open cell layer, the thickness of the closed cell layers (including the non-foamed layer), the length d of the square frame, the opening end area of the pore portions, and the total opening area ratio of the pore portions to the surface of the secondarily foamed, molded product are shown in Tables 5 and 6.

Measurements about the evaluation items of the secondarily foamed, molded product were conducted in methods identical with the measurement methods for the foam sheets for a car interior member. In Tables 5 and 6, the thicknesses of the closed cell layers are described in order of the closed cell layers 12a and 12b. About measurements of the pore portions in Examples 8 to 11, the skin material 7 and the surface sheet 5 were peeled and removed from the surface of the secondarily foamed, molded product, so as to make the pore portions naked. In this state, the above-mentioned items were measured.

(Moldability)

An ethylene-vinyl acetate copolymer-based hot melt adhesive (melting point: 97° C.) in a powdery form was evenly sprayed onto a single face of a surface material 7 (manufactured by Kureha Ltd.; weight per unit area: 130 g/m$^2$) made of a nonwoven cloth made of polyethylene terephthalate fiber in an amount of 30 g/m$^2$.

Thereafter, the skin material 7 was heated to a temperature of the melting point or more of the hot melt adhesive, and further the skin material 7 was pressed from both outer faces at a pressure of 0.7 MPa to fixedly bond the hot melt adhesive onto the single face of the skin material 7 in the state that a part of the adhesive was infiltrated into the skin material 7.

The skin material 7 was stacked onto the pore portion 2 formation face of each of the foam sheets A for a car interior member so as to direct the adhesive-bonded face of the skin material 7 toward the foam sheet A for a car interior member. Additionally, an abnormal sound preventing material 8 (trade name: "ECULE 6151A" manufactured by Toyobo Co., Ltd.) made of a nonwoven cloth made of polyethylene terephthalate fiber was laminated on the other face of the foam sheet A for a car interior member in the state that the hot melt adhesive powder adhering substantially evenly onto the whole of one face of the abnormal sound preventing material 8 was directed toward the foam sheet A for a car interior member. In this way, a laminate was produced. About the foam sheets A for a car interior member of Examples 8 and 10, the abnormal sound preventing material 8 was laminated only on the other face thereof in the above-mentioned manner, so as to produce a laminate.

Thereafter, the above-mentioned laminate was supplied between a pair of belts made of polytetrafluoroethylene, the surface temperature of the belts being kept at 135 to 145° C. This laminate was heated and compressed from both faces thereof into the thickness direction, so as to integrally laminate the skin material 7 and the abnormal sound preventing material 8 on the single face of the foam sheet A for a car interior member and the other face thereof, respectively.

Figure 19:
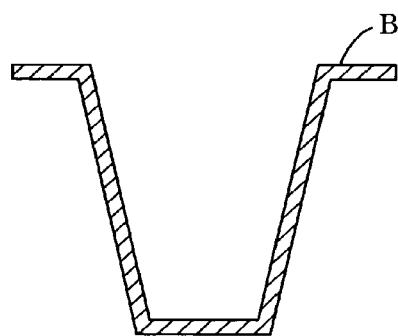
FIG. 19 is a schematic vertical sectional view illustrating a molded product obtained in examples.
Figure 20:
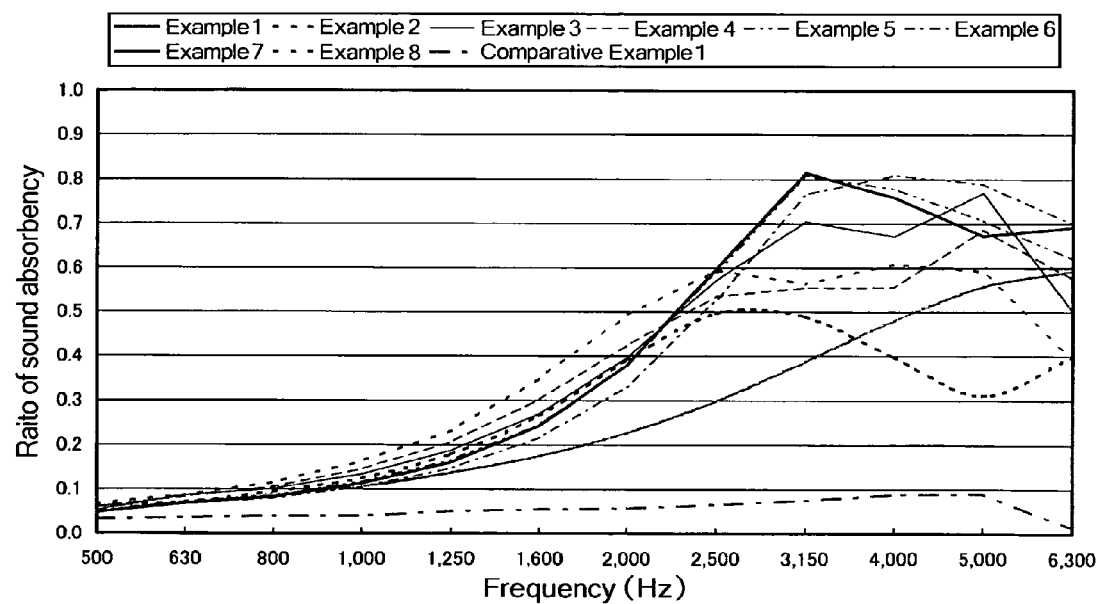
FIG. 20 is a graph showing results of the sound absorbency of a foam sheet for a car interior member.
Figure 21:
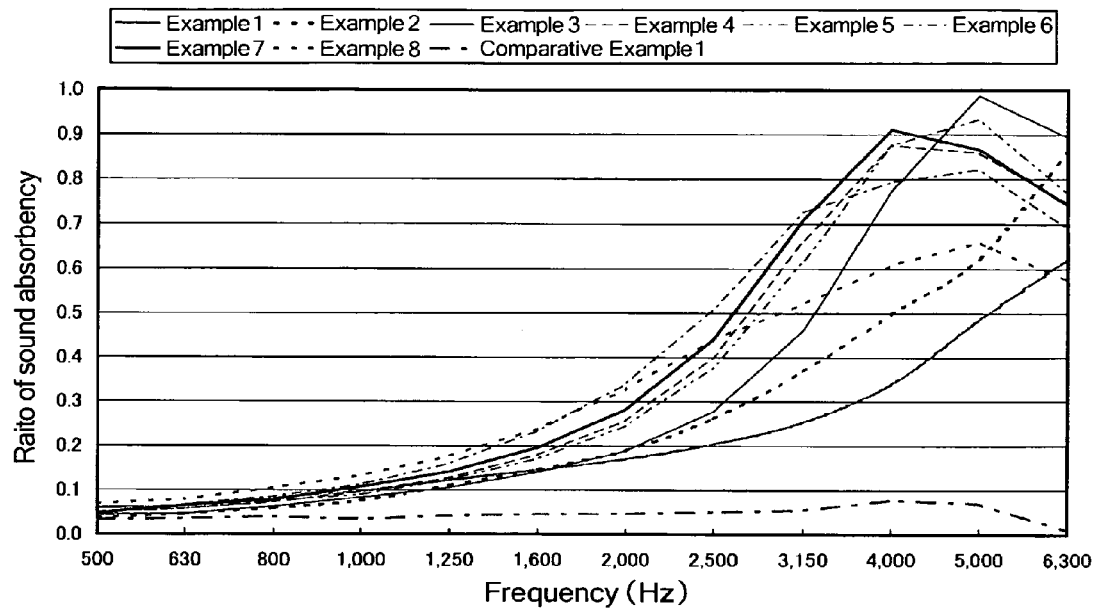
FIG. 21 is a graph showing results of the sound absorbency of a secondarily foamed, molded product.
Figure 22:
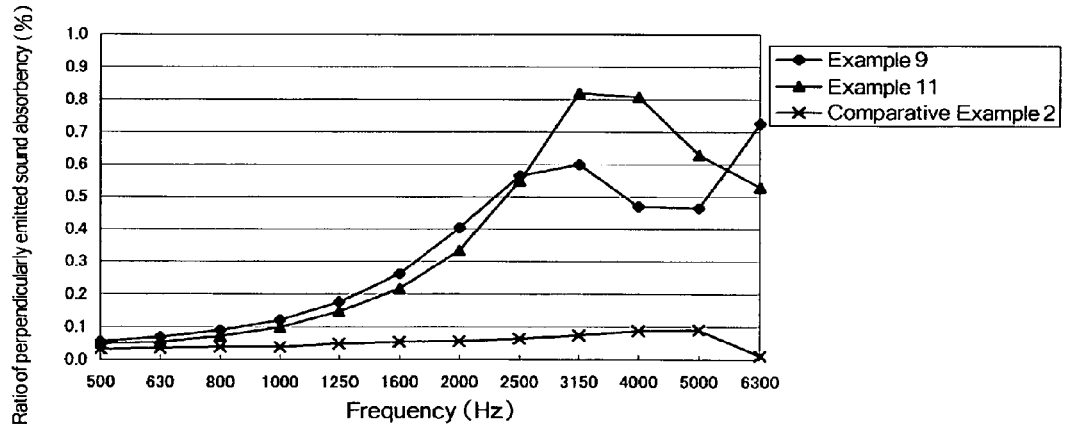
FIG. 22 is a graph showing measurement results of the sound absorbency of a foam sheet for a car interior member.
Figure 23:
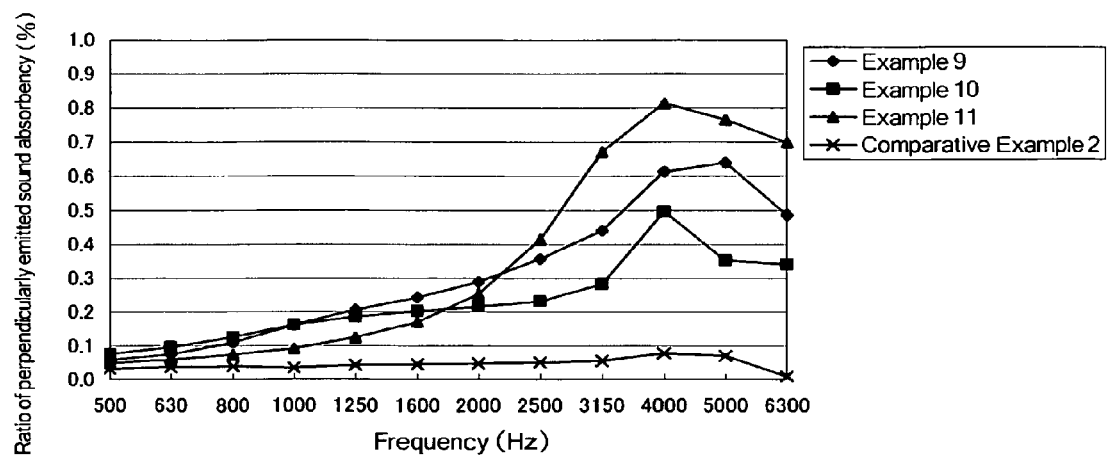
FIG. 23 is a graph showing results of the sound absorbency of a secondarily foamed, molded product.

A test piece having a given shape was cut out from the foam sheet A for a car interior member, which the skin material 7 and the abnormal sound preventing material 8 were integrally laminated on as described above. This test piece was heated to set the surface temperature of both faces thereof to a temperature shown in Table 5 or 6, thereby yielding a molded product B having a shape as illustrated in FIG. 19, i.e., a shape that a flange was extended into the horizontal direction from the entire circumference of the top end edge of a cylinder, having a bottom, to the outside thereof. The external appearance of the molded product B was observed with the naked eye. The external appearance was evaluated on the basis of the following criterion. For reference, the foam sheet A for a car interior member was molded to direct the skin material 7 of the foam sheet A for a car interior member inwards. In FIG. 19, details of the layer structure of the molded product B are omitted.

○: The molded product B was not torn, and the thickness thereof was also substantially even.

×: The molded product B was torn, and the thickness was scattering.

TABLE 1

| Frequency (Hz) | Example 1 | Example 2 | Example 3 | Example 4 | Example 5 | Example 6 | Example 7 | Example 8 | Comparative Example 1 |
|---|---|---|---|---|---|---|---|---|---|
| 500 | 0.061 | 0.063 | 0.053 | 0.059 | 0.050 | 0.046 | 0.048 | 0.067 | 0.033 |
| 630 | 0.068 | 0.071 | 0.087 | 0.083 | 0.072 | 0.067 | 0.068 | 0.087 | 0.036 |

TABLE 1-continued

| Frequency (Hz) | Example 1 | Example 2 | Example 3 | Example 4 | Example 5 | Example 6 | Example 7 | Example 8 | Comparative Example 1 |
|---|---|---|---|---|---|---|---|---|---|
| 800 | 0.089 | 0.095 | 0.101 | 0.105 | 0.085 | 0.079 | 0.083 | 0.115 | 0.040 |
| 1,000 | 0.105 | 0.124 | 0.134 | 0.145 | 0.117 | 0.105 | 0.113 | 0.163 | 0.040 |
| 1,250 | 0.137 | 0.179 | 0.188 | 0.207 | 0.166 | 0.147 | 0.161 | 0.232 | 0.050 |
| 1,600 | 0.175 | 0.266 | 0.271 | 0.303 | 0.247 | 0.217 | 0.244 | 0.350 | 0.055 |
| 2,000 | 0.228 | 0.390 | 0.396 | 0.424 | 0.378 | 0.331 | 0.379 | 0.492 | 0.057 |
| 2,500 | 0.299 | 0.496 | 0.572 | 0.535 | 0.589 | 0.526 | 0.598 | 0.595 | 0.065 |
| 3,150 | 0.387 | 0.489 | 0.705 | 0.555 | 0.808 | 0.766 | 0.815 | 0.564 | 0.075 |
| 4,000 | 0.480 | 0.398 | 0.672 | 0.556 | 0.778 | 0.809 | 0.759 | 0.609 | 0.088 |
| 5,000 | 0.557 | 0.311 | 0.770 | 0.687 | 0.707 | 0.789 | 0.673 | 0.592 | 0.090 |
| 6,300 | 0.593 | 0.400 | 0.501 | 0.575 | 0.620 | 0.699 | 0.692 | 0.393 | 0.012 |

TABLE 2

| Frequency (Hz) | Example 1 | Example 2 | Example 3 | Example 4 | Example 5 | Example 6 | Example 7 | Example 8 | Comparative Example 1 |
|---|---|---|---|---|---|---|---|---|---|
| 500 | 0.060 | 0.038 | 0.045 | 0.049 | 0.050 | 0.050 | 0.048 | 0.069 | 0.033 |
| 630 | 0.064 | 0.047 | 0.047 | 0.058 | 0.058 | 0.067 | 0.066 | 0.079 | 0.036 |
| 800 | 0.083 | 0.060 | 0.064 | 0.073 | 0.075 | 0.086 | 0.079 | 0.105 | 0.040 |
| 1,000 | 0.097 | 0.076 | 0.084 | 0.096 | 0.090 | 0.113 | 0.108 | 0.133 | 0.035 |
| 1,250 | 0.123 | 0.111 | 0.106 | 0.128 | 0.124 | 0.160 | 0.142 | 0.177 | 0.043 |
| 1,600 | 0.145 | 0.146 | 0.141 | 0.180 | 0.171 | 0.233 | 0.196 | 0.238 | 0.046 |
| 2,000 | 0.170 | 0.190 | 0.189 | 0.257 | 0.245 | 0.340 | 0.282 | 0.328 | 0.048 |
| 2,500 | 0.204 | 0.262 | 0.278 | 0.401 | 0.378 | 0.511 | 0.442 | 0.441 | 0.051 |
| 3,150 | 0.254 | 0.370 | 0.462 | 0.663 | 0.618 | 0.726 | 0.710 | 0.522 | 0.056 |
| 4,000 | 0.339 | 0.499 | 0.774 | 0.876 | 0.876 | 0.794 | 0.911 | 0.609 | 0.078 |
| 5,000 | 0.485 | 0.623 | 0.987 | 0.858 | 0.934 | 0.821 | 0.866 | 0.659 | 0.070 |
| 6,300 | 0.623 | 0.862 | 0.894 | 0.746 | 0.767 | 0.690 | 0.743 | 0.574 | 0.009 |

TABLE 3

| Frequency (Hz) | Example 9 | Example 11 | Comparative Example 2 |
|---|---|---|---|
| 500 | 0.06 | 0.05 | 0.03 |
| 630 | 0.07 | 0.05 | 0.04 |
| 800 | 0.09 | 0.07 | 0.04 |
| 1000 | 0.12 | 0.10 | 0.04 |
| 1250 | 0.18 | 0.15 | 0.05 |
| 1600 | 0.26 | 0.22 | 0.06 |
| 2000 | 0.40 | 0.33 | 0.06 |
| 2500 | 0.57 | 0.55 | 0.07 |
| 3150 | 0.60 | 0.82 | 0.08 |
| 4000 | 0.47 | 0.81 | 0.09 |
| 5000 | 0.46 | 0.63 | 0.09 |
| 6300 | 0.73 | 0.53 | 0.01 |

TABLE 4

| Frequency (Hz) | Example 9 | Example 10 | Example 11 | Comparative Example 2 |
|---|---|---|---|---|
| 500 | 0.06 | 0.08 | 0.05 | 0.03 |
| 630 | 0.07 | 0.10 | 0.06 | 0.04 |
| 800 | 0.11 | 0.13 | 0.07 | 0.04 |
| 1000 | 0.16 | 0.16 | 0.09 | 0.04 |
| 1250 | 0.21 | 0.19 | 0.13 | 0.04 |
| 1600 | 0.24 | 0.20 | 0.17 | 0.05 |
| 2000 | 0.29 | 0.22 | 0.25 | 0.05 |
| 2500 | 0.36 | 0.23 | 0.42 | 0.05 |
| 3150 | 0.44 | 0.28 | 0.67 | 0.06 |
| 4000 | 0.61 | 0.50 | 0.81 | 0.08 |
| 5000 | 0.64 | 0.35 | 0.76 | 0.07 |
| 6300 | 0.49 | 0.34 | 0.70 | 0.01 |

TABLE 5

|  | Example 1 | Example 2 | Example 3 | Example 4 | Example 5 | Example 6 | Example 7 | Example 8 | Comparative Example 1 |
|---|---|---|---|---|---|---|---|---|---|
| Surface temperature (° C.) | 140 | 140 | 132 | 132 | 132 | 130 | 130 | 130 | 140 |
| Total thickness (mm) | 5.7 | 4.8 | 5.4 | 5.5 | 5.9 | 5.8 | 5.9 | 5.6 | 4.8 |
| Thickness of open cell layer (mm) | 3.6 | 3.0 | 5.2 | 5.3 | 5.7 | 5.6 | 5.7 | 4.8 | 1.7 |
| Thickness of closed cell layer (mm) | 0.8/1.3 | 0.6/1.2 | — | — | — | — | — | — | 1.4/1.7 |
| Length d of square frame (mm) | 8 | 8 | 4 | 5.3 | 4 | 4 | 4 | 4 | 8 |
| Opening end area of pore portion (mm$^2$) | 3.46 | 6.15 | 0.97 | 1.18 | 1.01 | 0.92 | 0.96 | 0.97 | 3.46 |
| Total opening area ratio (%) | 10.8 | 19.2 | 12.2 | 8.4 | 12.6 | 11.5 | 12.1 | 12.2 | 10.8 |
| Moldability | ○ | ○ | ○ | ○ | ○ | ○ | ○ | ○ | ○ |

TABLE 6

|  | Example 9 | Example 10 | Example 11 | Comparative Example 2 |
|---|---|---|---|---|
| Surface temperature (° C.) | 140 | 140 | 140 | 140 |
| Total thickness (mm) | 6.5 | 7.2 | 5.7 | 5.6 |
| Thickness of open cell layer (mm) | 3.5 | 3.0 | 4.7 | 1.4 |
| Thickness of closed cell layer (mm) | 1.3/0.9 | 1.3/0.8 | — | 1.6/1.8 |
| Length d of square frame (mm) | 8 | 8 | 6 | 8 |
| Opening end area of pore portion (mm$^2$) | 2.54 | 2.54 | 1.27 | 3.46 |
| Total opening area ratio of pore portion (%) | 7.9 | 7.9 | 7.0 | 10.8 |
| Moldability | ○ | ○ | ○ | ○ |
| Linear expansion ratio (×10$^6$/° C.) | 9.54 | 9.01 | 12.20 | 13.10 |

INDUSTRIAL APPLICABILITY

The foam sheet for a car interior member according to the present invention is suitable for being used as a car interior member such as a car ceiling member or a door member.

The invention claimed is:

1. A foam sheet for a car interior member, said foam sheet comprising
a modified polyphenylene ether-based resin foam sheet having an open cell ratio of 60 to 85% as a whole, and
modified polyphenylene ether-based resin sheets integrally laminated on both faces of the modified polyphenylene ether-based resin foam sheet,
wherein the modified polyphenylene ether-based resin foam sheet comprises (1) a foamed layer and (2) pore portions formed in a single face of said foam sheet so as to be open in said face,
wherein the foam layer comprises an open cell layer having an open cell ratio of 70% or more,
wherein the ratio of the total opening area of the pore portions to the surface of the foam sheet is from 2 to 50%,
wherein the opening end area of the pore portions is from 0.2 to 40 mm$^2$,
wherein the pore portions are (A) specifically shaped and have a depth to induce the vibration energy of sounds into the open cells of the open cell layer of the foam sheet, and (B) opened to the surfaces of the modified polyphenylene ether-based resin sheets,
wherein said modified polyphenylene ether-based resin sheets contain no foam cells, and
wherein the modified polyphenylene ether-based resin constituting the modified polyphenylene ether-based resin sheet has a glass transition temperature $T_g$ 10 to 40° C. lower than a glass transition temperature $T_g$ of the modified polyphenylene ether-based resin constituting the modified polyphenylene ether-based resin foam sheet.

2. The foam sheet for a car interior member according to claim 1, wherein a surface sheet made of nonwoven cloth comprising a form-keeping fiber and a thermoplastic resin fiber is integrally laminated on the face in which the pore portions are formed in the modified polyphenylene ether-based resin foam sheet.

3. The foam sheet for a car interior member according to claim 2, wherein the form-keeping fiber is at least one fiber selected from the group consisting of glass fiber, carbon fiber, basalt fiber and natural fiber and further the melting point Tm (° C.) of the thermoplastic resin fiber and the glass transition temperature Tg (° C.) of the modified polyphenylene ether-based resin which constitutes the modified polyphenylene ether-based resin foam sheet satisfy the following expression:

$$Tg-65° C. \leq Tm \leq Tg+40° C.$$

4. The foam sheet for a car interior member according to claim 2, wherein the modified polyphenylene ether-based resin foam sheet and the surface sheet are integrated with each other through an adhesive layer.

5. The foam sheet for a car interior member according to claim 4, wherein the whole of the surface sheet is impregnated with an adhesive which constitutes the adhesive layer.

6. The foam sheet for a car interior member according to claim 1, wherein a foamed layer of the modified polyphenylene ether-based resin foam sheet has an open cell layer made mainly of open cells, and the pore portions reach the open cell layer.

7. The foam sheet for a car interior member according to claim 1, wherein a foamed layer of the modified polyphenylene ether-based resin foam sheet is made only of an open cell layer made mainly of open cells.

8. The foam sheet for a car interior member according to claim 1, wherein in a foamed layer of the modified polyphenylene ether-based resin foam sheet, closed cell layers made mainly of closed cells are formed on both faces of an open cell layer made mainly of open cells, and the pore portions reach the open cell layer.

9. The foam sheet for a car interior member according to claim 8, wherein the thickness of the closed cell layers is from 1 to 25% of the thickness of the modified polyphenylene ether-based resin foam sheet.

10. The foam sheet for a car interior member according to claim 1, wherein the modified polyphenylene ether-based resin which constitutes the modified polyphenylene ether-based resin foam sheet comprises 15 to 60% by weight of a phenylene ether component and 40 to 85% by weight of a styrene component.

11. The foam sheet for a car interior member according to claim 1, wherein the modified polyphenylene ether-based resin which constitutes the modified polyphenylene ether-based resin sheet comprises 10 to 50% by weight of a phenylene ether component and 50 to 90% by weight of a styrene component.

12. The foam sheet for a car interior member according to claim 1, wherein the modified polyphenylene ether-based resin sheet comprises a rubber component.

13. The foam sheet for a car interior member according to claim 1, wherein a skin material is integrally laminated on one face of the modified polyphenylene ether-based resin foam sheet, and further an abnormal noise preventing member is integrally laminated on the other face of the modified polyphenylene ether-based resin foam sheet.

14. A car interior member which is obtained by thermally-molding the foam sheet for a car interior member according to any one of claims 1, 6-8, 9, 10-12 and 13.

15. The car interior member according to any one of claims 1, 6-8, 9, 10-12 and 13, which is a car ceiling member.

16. The foam sheet for a car interior member according to claim 1, wherein the pore portions have a depth from 10 to 95% of the thickness of the modified polyphenylene ether-based resin foam sheet.

17. The foam sheet for a car interior member according to claim 1, wherein the pore portions have one or more shapes selected from the group consisting of a polygon shape, a round shape and an elliptic shape.

* * * * *